(12) United States Patent
Ding et al.

(10) Patent No.: US 9,363,825 B2
(45) Date of Patent: Jun. 7, 2016

(54) INDICATION MAP DELIVERY METHOD, INDICATION OPERATION METHOD, DEVICE, AND SYSTEM

(71) Applicant: Huawei Device Co., Ltd., Shenzhen (CN)

(72) Inventors: Zhiming Ding, Shenzhen (CN); Ping Fang, Shenzhen (CN); Yunbo Li, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 120 days.

(21) Appl. No.: 14/315,657

(22) Filed: Jun. 26, 2014

(65) Prior Publication Data

US 2014/0307679 A1 Oct. 16, 2014

Related U.S. Application Data

(63) Continuation of application No. PCT/CN2012/087375, filed on Dec. 25, 2012.

(30) Foreign Application Priority Data

Dec. 29, 2011 (CN) .......................... 2011 1 0452272

(51) Int. Cl.
*H04W 72/12* (2009.01)
*H04W 74/00* (2009.01)
*H04W 28/06* (2009.01)

(52) U.S. Cl.
CPC ........ *H04W 72/1278* (2013.01); *H04W 74/006* (2013.01); *H04W 28/06* (2013.01)

(58) Field of Classification Search
None
See application file for complete search history.

(56) References Cited

U.S. PATENT DOCUMENTS

| 2005/0232200 | A1 | 10/2005 | Jeong et al. |
| 2009/0275369 | A1 | 11/2009 | Hsu et al. |
| 2012/0014305 | A1 | 1/2012 | Kakani et al. |

(Continued)

FOREIGN PATENT DOCUMENTS

| CN | 101194471 A | 6/2008 |
| CN | 102017732 A | 4/2011 |
| WO | 2011158407 A1 | 12/2011 |

OTHER PUBLICATIONS

"Part 11: Wireless LAN medium Access Control (MAC) and Physical Layer (PHY) Specifications," IEEE Computer Society, 802.11, Jun. 12, 2007, 1232 pages.
"Extension of AID and TIM to Support 6000 STAs in 802.11ah," IEEE 802.11-11/1550r1, Nov. 8, 2011, 9 pages.

(Continued)

*Primary Examiner* — Kodzovi Acolatse
(74) *Attorney, Agent, or Firm* — Conley Rose P.C.; Grant Rodolph; Nicholas K. Beaulieu

(57) ABSTRACT

An indication map delivery method, an indication operation method, a device, and a system are provided. In the embodiments of the present invention, a compressed Indication Map (IM) generated by a wireless access device includes at least one of a tiny partial bitmap sub-element, a skipped indication bits sub-element, and an indication bit offset sub-element, and consecutive indication bits with the same value at positions in an original IM can be compressed into a skipped indication bits sub-element, an indication bit offset sub-element, or the like. The technical solutions of the embodiments of the present invention facilitate improvement of compression efficiency of an IM, and further reduce radio air interface resources occupied for sending the IM and improve IM sending efficiency.

11 Claims, 13 Drawing Sheets

(56) References Cited

U.S. PATENT DOCUMENTS

| | | | |
|---|---|---|---|
| 2012/0127920 A1 | 5/2012 | Kobayashi | |
| 2013/0128831 A1* | 5/2013 | Calcev | H04W 72/042 370/329 |
| 2013/0143606 A1* | 6/2013 | Merlin | H04W 52/0209 455/458 |
| 2013/0250833 A1* | 9/2013 | Kim | H04W 52/0206 370/311 |

OTHER PUBLICATIONS

Foreign Communication From a Counterpart Application, PCT Application No. PCT/CN2012/087375, English Translation of International Search Report dated Apr. 4, 2013, 2 pages.

Foreign Communication From a Counterpart Application, PCT Application No. PCT/CN2012/087375, English Translation of Written Opinion dated Apr. 4, 2013, 6 pages.

* cited by examiner

| A wireless access device generates a compressed IM, where the compressed IM includes at least one of an SIBE, an IBOE, and a TPBE, where the TPBE includes a TPBF and a TPBE type indication field, and the TPBF is used for indicating a segment with a set length from a compress start position corresponding to the TPBE in an original IM corresponding to the compressed IM; the SIBE includes an SIBF and an SIBE type indication field, and the SIBF is used for indicating the number of skipped consecutive indication bits with the same value from a compress start position corresponding to the SIBE in the original IM; and the IBOE includes an IBOF and an IBOE type indication field, and the IBOF is used for indicating an indication bit serial number corresponding to an indication bit right behind skipped consecutive indication bits with the same value from a compress start position corresponding to the IBOE in the original IM | ⟋101 |

↓

| The wireless access device sends the compressed IM | ⟋102 |

FIG. 1A

| A terminal device receives a compressed IM, where the compressed IM includes at least one of an SIBE, an IBOE, and a TPBE, where the TPBE includes a TPBF and a TPBE type indication field, and the TPBF is used for indicating a segment with a set length from a compress start position corresponding to the TPBE in an original IM corresponding to the compressed IM; the SIBE includes an SIBF and an SIBE type indication field, and the SIBF is used for indicating the number of skipped consecutive indication bits with the same value from a compress start position corresponding to the SIBE in the original IM; and the IBOE includes an IBOF and an IBOE type indication field, and the IBOF is used for indicating an indication bit serial number corresponding to an indication bit right behind skipped consecutive indication bits with the same value from a compress start position corresponding to the IBOE in the original IM | 201 |
|---|---|

↓

| The terminal device determines, through compressing the compressed IM, a value of an indication bit corresponding to an indication bit serial number corresponding to the mobile device in the corresponding original IM; and if the value of the indication bit corresponding to the indication bit serial number corresponding to the mobile device indicates that the terminal device needs to execute an indicated operation, the terminal device executes the indicated operation | 202 |
|---|---|

FIG. 2

INDICATION MAP DELIVERY METHOD, INDICATION OPERATION METHOD, DEVICE, AND SYSTEM

CROSS-REFERENCE TO RELATED APPLICATIONS

This application is a continuation of International Application No. PCT/CN2012/087375, filed on Dec. 25, 2012, which claims priority to Chinese Patent Application No. 201110452272.1, filed on Dec. 29, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to an indication map delivery method, an indication operation method, a device, and a system.

BACKGROUND

The Institute of Electrical and Electronics Engineers (IEEE) 802.11 supports a power saving transmission mechanism called a traffic indication map (TIM) mechanism. In the TIM mechanism, a station (STA) (namely, a station supporting the 802.11 protocol, referring to a mobile device in this specification) may enter a power saving state, and when a beacon frame transmission cycle of an access point (AP) is reached, the mobile device wakes up to receive a beacon frame, and checks whether indication information included in the beacon frame indicates that the mobile device has downlink data to transmit. The AP allocates an association identifier (AID) to each mobile device when the mobile device establishes a connection with the AP, and the TIM is used in the beacon frame to indicate whether the mobile device has downlink data to transmit. Each bit in an original TIM corresponds to a possible mobile device, and the serial number of the position of the bit (namely, indication bit) in the original TIM corresponds to a transmission indication bit serial number (namely, AID) of a mobile device.

In the existing stipulation of IEEE 802.11, it is defined that one AP can support 2007 mobile devices at most, but actually, the number of mobile devices connected to one AP is limited by the bandwidth of the AP and the like, where generally dozens of, at most, hundreds of mobile devices exist. When allocating transmission indication bit serial numbers to connected mobile devices, the AP generally centralizes the transmission indication bit serial numbers in a certain area. Therefore, the TIM is generally not very long.

In the IEEE 802.11ah standard being stipulated, one AP is required to support 6000 mobile devices. Because IEEE 802.11ah mainly focuses on an application scenario (such as a smart metering scenario) where a mobile device generally has a small data amount, as seen from bandwidth resources, one AP absolutely can support thousands of mobile devices, and sometimes 6000 mobile devices may be on the network simultaneously. As a result, the TIM may be very long. However, the number of bits in the TIM with the value "1" (indicating that downlink data exists) is generally not very large. Therefore, it is necessary and also possible to compress the TIM for sending.

In the existing IEEE 802.11 standard, a simple compression algorithm is defined for the TIM, that is, several leading 0-value bits and several rear 0-value bits in the original TIM are removed directly, so as to reduce the length of the beacon frame. Based on the existing compression algorithm, in a case in which, for example, 1-value bits exist in both the head and the tail, the TIM cannot be compressed even though a large number of 0-value bits exist in the middle. As described above, in main application environments of the current IEEE 802.11, the existing compression algorithm is barely applicable, but in other application environments such as an application environment of IEEE 802.11 ah and an application environment with a large number of STAs, because the existing compression algorithm has low efficiency in compressing the TIM, an actual TIM compression requirement is hard to be met. For other similar indication maps (IMs), the prior art has a similar problem that an actual compression requirement is hard to be met.

SUMMARY

Embodiments of the present invention provide an indication map delivery method, an indication operation method, a device, and a system, so as to improve compression and delivery efficiency of an indication map.

In order to solve the foregoing technical problem, the embodiments of the present invention provide the following technical solutions.

In one aspect, an embodiment of the present invention provides an indication map delivery method, including: generating a compressed indication map, where the compressed indication map includes at least one of a tiny partial bitmap sub-element, a skipped indication bits sub-element, and an indication bit offset sub-element, where the tiny partial bitmap sub-element includes a tiny partial bitmap field and a tiny partial bitmap sub-element type indication field, and the tiny partial bitmap field is used for indicating a segment with a set length from a compress start position corresponding to the tiny partial bitmap sub-element in an original indication map corresponding to the compressed indication map; the skipped indication bits sub-element includes a skipped indication bits field and a skipped indication bits sub-element type indication field, and the skipped indication bits field is used for indicating the number of skipped consecutive indication bits with the same value from a compress start position corresponding to the skipped indication bits sub-element in the original indication map; and the indication bit offset sub-element includes an indication bit offset field and an indication bit offset sub-element type indication field, and the indication bit offset field is used for indicating an indication bit serial number corresponding to an indication bit behind skipped consecutive indication bits with the same value from a compress start position corresponding to the indication bit offset sub-element in the original indication map; and sending the compressed indication map.

In another aspect, an embodiment of the present invention further provides an indication operation method, including: receiving, by a mobile device, a compressed indication map, where the compressed indication map includes at least one of a tiny partial bitmap sub-element, a skipped indication bits sub-element, and an indication bit offset sub-element, where the tiny partial bitmap sub-element includes a tiny partial bitmap field and a tiny partial bitmap sub-element type indication field, and the tiny partial bitmap field is used for indicating a segment with a set length from a compress start position corresponding to the tiny partial bitmap sub-element in an original indication map corresponding to the compressed indication map; the skipped indication bits sub-element includes a skipped indication bits field and a skipped indication bits sub-element type indication field, and the skipped indication bits field is used for indicating the number of skipped consecutive indication bits with the same value from a compress start position corresponding to the skipped indication bits sub-element in the original indication map; and the indication bit offset sub-element includes an indication bit offset field and an indication bit offset sub-element type indication field, and the indication bit offset field is used for indicating an indication bit serial number corresponding to an indication bit behind skipped consecutive indication bits with the same value from a compress start position corresponding to the indication bit offset sub-element in the original indication map; and determining, by the mobile device by decompressing the compressed indication map, a value of an indication bit corresponding to an indication bit serial number corresponding to the mobile device in the original indication map; and if the value of the indication bit corresponding to the indication bit serial number corresponding to the mobile device indicates that the mobile device needs to execute an indicated operation, executing, by the mobile device, the indicated operation.

In another aspect, an embodiment of the present invention further provides a wireless access device, including: a generation module configured to generate a compressed indication map, where the compressed indication map includes at least one of a tiny partial bitmap sub-element, a skipped indication bits sub-element, and an indication bit offset sub-element, where the tiny partial bitmap sub-element includes a tiny partial bitmap field and a tiny partial bitmap sub-element type indication field, and the tiny partial bitmap field is used for indicating a segment with a set length from a compress start position corresponding to the tiny partial bitmap sub-element in an original indication map corresponding to the compressed indication map; the skipped indication bits sub-element includes a skipped indication bits field and a skipped indication bits sub-element type indication field, and the skipped indication bits field is used for indicating the number of skipped consecutive indication bits with the same value from a compress start position corresponding to the skipped indication bits sub-element in the original indication map; and the indication bit offset sub-element includes an indication bit offset field and an indication bit offset sub-element type indication field, and the indication bit offset field is used for indicating an indication bit serial number corresponding to an indication bit behind skipped consecutive indication bits with the same value from a compress start position corresponding to the indication bit offset sub-element in the original indication map; and a sender configured to send the compressed indication map generated by the generation module.

In another aspect, an embodiment of the present invention further provides a mobile device, including: a receiver configured to receive a compressed indication map, where the compressed indication map includes at least one of a tiny partial bitmap sub-element, a skipped indication bits sub-element, and an indication bit offset sub-element, where the tiny partial bitmap sub-element includes a tiny partial bitmap field and a tiny partial bitmap sub-element type indication field, and the tiny partial bitmap field is used for indicating a segment with a set length from a compress start position corresponding to the tiny partial bitmap sub-element in an original indication map corresponding to the compressed indication map; the skipped indication bits sub-element includes a skipped indication bits field and a skipped indication bits sub-element type indication field, and the skipped indication bits field is used for indicating the number of skipped consecutive indication bits with the same value from a compress start position corresponding to the skipped indication bits sub-element in the original indication map; and the indication bit offset sub-element includes an indication bit offset field and an indication bit offset sub-element type indication field, and the indication bit offset field is used for indicating an indication bit serial number corresponding to an indication bit behind skipped consecutive indication bits with the same value from a compress start position corresponding to the indication bit offset sub-element in the original indication map; a decompression and determination module configured to determine, by decompressing the compressed indication map received by the receiver, a value of an indication bit corresponding to an indication bit serial number corresponding to the mobile device in the original indication map; and an operation execution module configured to: if the decompression and determination module determines that the value of the indication bit corresponding to the indication bit serial number corresponding to the mobile device indicates that the mobile device needs to execute an indicated operation, execute the indicated operation.

In another aspect, an embodiment of the present invention further provides a communication system, including the wireless access device in the foregoing embodiment and/or the mobile device in the foregoing embodiment.

As can be seen from above, in the embodiments of the present invention, a compressed IM generated by a wireless access device includes at least one of a tiny partial bitmap sub-element, a skipped indication bits sub-element, and an indication bit offset sub-element, where the tiny partial bitmap sub-element includes a tiny partial bitmap field and a tiny partial bitmap sub-element type indication field, and the tiny partial bitmap field is used for indicating a segment with a set length from a compress start position corresponding to the tiny partial bitmap sub-element in an original indication map corresponding to the compressed indication map; the skipped indication bits sub-element includes a skipped indication bits field and a skipped indication bits sub-element type indication field, and the skipped indication bits field is used for indicating the number of skipped consecutive indication bits with the same value from a compress start position corresponding to the skipped indication bits sub-element in the original indication map; and the indication bit offset sub-element includes an indication bit offset field and an indication bit offset sub-element type indication field, and the indication bit offset field is used for indicating an indication bit serial number corresponding to an indication bit behind skipped consecutive indication bits with the same value from a compress start position corresponding to the indication bit offset sub-element in the original indication map. In this way, consecutive indication bits with the same value corresponding to positions in the original IM can be compressed into the skipped indication bits sub-element, the indication bit offset sub-element, or the like, which facilitates improvement of compression efficiency of an IM, and further reduces radio air interface resources occupied for sending the IM and improves IM sending efficiency.

BRIEF DESCRIPTION OF THE DRAWINGS

To illustrate the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

FIG. 1A is a schematic flowchart of an IM compression method according to an embodiment of the present invention;

FIG. 2 is a schematic diagram of an indication operation method according to an embodiment of the present invention;

DETAILED DESCRIPTION

Figure 1B:
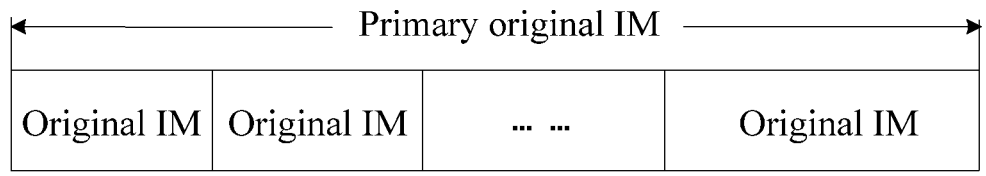
FIG. 1B is a schematic diagram of a divided primary IM according to an embodiment of the present invention.

Embodiments of the present invention provide an IM delivery method, an indication operation method, a device, and a system, which facilitate improvement of compression and delivery efficiency of an IM.

To make the solutions of the present invention more comprehensible for a person skilled in the art, the following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Detailed illustrations are made in the following.

For ease of description, in the embodiments of the present invention, a bit with a value "1" (a binary numerical value rather than a character) may be called a 1-value bit for short, a bit with a value "0" (a binary numerical value rather than a character) may be called a 0-value bit for short, and so on. For example, a first-value (for example, "0" or "1") bit is a bit with a value of a first value, and a second-value (for example, "1" or "0") bit is a bit with a value of a second value. Similarly, a first-value indication bit is an indication bit with a value of the first value, and a second-value indication bit is an indication bit with a value of the second value. Bit 0 indicates a bit numbered as 0, bit 1 indicates a bit numbered as 1, and so on, and bit 7 indicates a bit numbered as 7. In the embodiments of the present invention, each indication bit may occupy one bit, and may also occupy multiple bits (for example, two bits or the like). A statement such as a first (namely, the start position) indication bit actually refers to an indication bit with an index 0 in an indication bit group, and a statement such as a second indication bit actually refers to an indication bit with an index 1 in the indication bit group, and so on.

In the embodiments of the present invention, an IM may refer to a TIM, or may also refer to an IM of another type, for example, each indication bit of the IM may be used to indicate whether a possible corresponding mobile device can transmit uplink data, or each indication bit of the IM is used to indicate whether a possible corresponding accessing mobile device enters a sleeping state. That is to say, in the embodiments of the present invention, the IM refers to a bitmap of which each indication bit may be used to indicate that a corresponding object executes a corresponding operation.

In an embodiment of an IM delivery method of the present invention, the method may include: generating a compressed IM, where the compressed IM includes at least one of a tiny partial bitmap sub-element (TPBE), a skipped indication bits sub-element (SIBE), and an indication bit offset sub-element (IBOE), where the TPBE includes a tiny partial bitmap field (TPBF) and a TPBE type indication field, and the TPBF is used for indicating a segment with a set length from a compress start position corresponding to the TPBE in an original IM corresponding to the compressed IM; the SIBE includes a skipped indication bits field (SIBF) and an SIBE type indication field, and the SIBF is used for indicating the number of skipped consecutive indication bits with the same value from a compress start position corresponding to the SIBE in the original IM; and the IBOE includes an indication bit offset field (IBOF) and an IBOE type indication field, and the IBOF is used for indicating an indication bit serial number corresponding to an indication bit behind skipped consecutive indication bits with the same value from a compress start position corresponding to the IBOE in the original IM; and sending the compressed IM.

It should be noted that, the foregoing method may be executed by an access device or other IM compression devices in communication connection with an access device.

Referring to FIG. 1A, an IM delivery method provided by an embodiment of the present invention may include the following steps.

101: A wireless access device generates a compressed IM.

In an embodiment of the present invention, the wireless access device may generate an original IM (such as an original TIM), and then generate a compressed IM by compressing the original IM. Generating an original IM herein does not necessarily refer to generating a real IM data structure on a storage structure, and an IM formed by some indication information and flexible in form may be used, where the form of the indication information may be diversified, and definitely, a value of each indication bit of the original IM can be obtained according to the indication information. For example, one byte (where a value of each byte is merely 0 or 1) may be used to indicate one indication bit of the original IM. Each indication bit in the original IM is used to indicate whether a possible receiving end (for example, a mobile device, one or more applications of a mobile device, or the like) corresponding to an indication bit serial number of the indication bit in the original IM needs to execute a corresponding operation (for example, the TIM indicates whether it is required to receive downlink data). The wireless access device may first generate a complete original IM and then generate the compressed IM by compressing the original IM; or may also compress an original IM while generating the original IM, for example, once a segment of the original IM is generated, the segment of the original IM is compressed; or the wireless access device may first generate a primary original IM, divide the primary original IM into multiple IM groups, and consider each IM group as one original IM, and then the wireless access device compresses each IM group.

In an embodiment of the present invention, the wireless access device may generate the compressed IM by using multiple sub-elements (where the multiple sub-elements may include an SIBE, an IBOE, and a TPBE, and definitely may further include other sub-elements of other types). The compressed IM may include at least one sub-element, and the at least one sub-element may include the SIBE, the IBOE, and the TPBE and the like (where a decompression order of the sub-elements included in the compressed IM may be agreed on between a compression end and a decompression end or notified by one end to the other end, and the decompression order may be, for example, a left-to-right order or a right-to-left order). The TPBE includes a TPBF and a TPBE type indication field, and the TPBF is used for indicating a segment with a set length from a compress start position corresponding to the TPBE in the original IM corresponding to the compressed IM; the SIBE includes an SIBF and an SIBE type indication field, and the SIBF is used for indicating the number of skipped consecutive indication bits with the same value from a compress start position corresponding to the SIBE in the original IM; and the IBOE includes an IBOF and an IBOE type indication field, and the IBOF is used for indicating an indication bit serial number corresponding to an indication bit behind skipped consecutive indication bits with the same value from a compress start position corresponding to the IBOE in the original IM.

Different indication bits in the IM may have different indication bit serial numbers, for example, an indication bit serial number corresponding to each indication bit of a TIM may be an association identifier, an association identifier offset, or the like.

102: The wireless access device sends the compressed IM.

The wireless access device may, for example, bear the compressed IM in a beacon frame, and send the compressed IM through the beacon frame. Definitely, the wireless access device may also send the compressed IM through another broadcast frame. It may be understood that, the wireless access device may compress the whole original IM so as to generate the compressed IM and send the compressed IM; or may also first segment the whole original IM and then compress each segment, and may send, through one broadcast frame, the compressed IM obtained by segmentation compression, or send, through different broadcast frames, the compressed IM obtained by segmentation compression.

In addition, when sending the compressed IM, the wireless access device may carry a parameter related to the compressed IM in a message bearing the compressed IM, for example, information such as a segment number, the number of segments, the length of a sub-element, and whether the compressed IM is segmented.

As can be seen, in this embodiment, the compressed IM generated by the wireless access device includes at least one of the TPBE, the SIBE, and the IBOE, where the TPBE includes a TPBF and a TPBE type indication field, and the TPBF is used for indicating a segment with a set length from a compress start position corresponding to the TPBE in the original IM corresponding to the compressed IM; the SIBE includes an SIBF and an SIBE type indication field, and the SIBF is used for indicating the number of skipped consecutive indication bits with the same value from a compress start position corresponding to the SIBE in the original IM; and the IBOE includes an IBOF and an IBOE type indication field, and the IBOF is used for indicating an indication bit serial number corresponding to an indication bit behind skipped consecutive indication bits with the same value from a compress start position corresponding to the IBOE in the original IM. In this way, consecutive indication bits with the same value corresponding to positions in the original IM can be compressed into the SIBE, the IBOE, or the like, which facilitates improvement of compression efficiency of an IM, and further reduces radio air interface resources occupied for sending the IM and improves IM sending efficiency.

Diversified manners may be available for the wireless access device to generate the compressed IM that includes at least one sub-element.

In a feasible implementation manner, if there are M1 consecutive indication bits whose values are not completely the same from a start position of a remaining-to-be compressed segment of the original IM, the M1 indication bits are compressed into one TPBE, where a TPBF of the TPBE is used for indicating the M1 indication bits; if there are consecutive indication bits with the same value whose number is neither less than M1 nor greater than M2 from the start position of the remaining-to-be compressed segment of the original IM, the indication bits whose number is neither less than M1 nor greater than M2 are compressed into one SIBE, where an SIBF of the SIBE is used for indicating the number of the indication bits and the number is neither less than M1 nor greater than M2; and the SIBE further includes a skipped indication bit value field, where the skipped indication bit value field is used for indicating values of the indication bits whose number is neither less than M1 nor greater than M2, and M1 is less than or equal to M2; and if there are consecutive indication bits with the same value whose number is greater than M2 from the start position of the remaining-to-be compressed segment of the original IM, the indication bits whose number is greater than M2 are compressed into one IBOE, where an IBOF of the IBOE is used for indicating an indication bit serial number corresponding to an indication bit behind the indication bits whose number is greater than M2; and the IBOE further includes a skipped indication bit value field (BV field), where the skipped indication bit value field is used for indicating values of the indication bits whose number is greater than M2.

M1 may be equal to, for example, the number of indication bits of the TPBF in the TPBE (that is, the maximum length of the segment of the original IM that can be indicated). M2 may be equal to, for example, a maximum value of the SIBF field (that is, values of all bits are "1"), or some or all values of the SIBF field less than M1 may also be defined to values greater than the maximum value of the SIBF field, or it is defined that the value of the SIBF field plus M1 is the number of actually indicated skipped indication bits. Specifically, how the maximum value indicated by the SIBF in the SIBE is defined is determined according to an actual condition. For example, when the length of the TPBF is three bits, and the length of the SIBF is five bits, M1 is equal to 3, and M2 may be equal to 31 (the maximum value of the SIBF) or 34 (where because M1 is 3, the SIBF skips at least three indication bits, and accordingly a range of a value that the SIBF can indicate may be defined to 3 to 34); or, when the length of the TPBF is seven bits, and the length of the SIBF is six bits, M1 is equal to 7, and M2 may be equal to 63 (the maximum value of the SIBF) or 70 (where, in this case, because the SIBF skips at least seven indication bits, a range of a value that the SIBF can indicate may be defined to 7 to 70) or a value between 63 and 70. Certainly, M1 may also have other values, and M2 may also be other positive integers greater than M1. In addition, values of M1 and M2 and lengths of the TPBF and SIBF fields may also be specifically set according to the length and density of the original IM to be compressed, so as to achieve an optimal compression effect. As can be seen, the exemplified compression manner is a manner that can compress consecutive indication bits with the same value.

In another feasible implementation manner, if, from a start position of a segment, of the original IM, remaining to be compressed, there are N1 consecutive indication bits that include a first-value indication bit (assuming that each indication bit occupies one bit, the first-value indication bit may be a 0-value indication bit while a second-value indication bit is a 1-value indication bit, or the first-value indication bit may be a 1-value indication bit while the second-value indication bit is a 0-value indication bit, and a case where an indication bit occupies multiple bits is deducted by analogy; the first value and the second value are different values for an indication bit, where by using the original IM being an original TIM as an example, a value of each indication bit in the original TIM being the first value (for example, the value being "1") may indicate that a receiving end corresponding to the indication bit has downlink data that needs to be received, while being the second value (for example, being "0") indicates that the receiving end corresponding to the indication bit has no downlink data to be received or no corresponding receiving end exists), the N1 consecutive indication bits are compressed into one TPBE, where a TPBF of the TPBE is used for indicating the N1 consecutive indication bits; if there are consecutive second-value indication bits whose number is neither less than N1 nor greater than N2 from the start position of the remaining-to-be compressed segment of the original IM, the second-value indication bits whose number is neither less than N1 nor greater than N2 are compressed into one SIBE, where an SIBF of the SIBE is used for indicating the number of the second-value indication bits whose number is neither less than N1 nor greater than N2; and if there are consecutive second-value indication bits whose number is greater than N2 from the start position of the remaining-to-be compressed segment of the original IM, the second-value indication bits whose number is greater than N2 are compressed into one IBOE, where an IBOF of the IBOE is used for indicating an indication bit serial number corresponding to an indication bit behind the second-value indication bits whose number is greater than N2; and N1 is less than or equal to N2.

N1 is equal to, for example, the number of indication bits of the TPBF in the TPBE. N2 is equal to a maximum value that the SIBF can indicate in the SIBE; N2 is equal to, for example, a maximum value of the SIBF (that is, values of all bits are "1"), or some or all values of the SIBF field less than N1 may also be defined to values greater than the maximum value of the SIBF field, or it is defined that the value of the SIBF field plus N1 is the number of actually indicated skipped indication bits. Specifically, how the maximum value indicated by the SIBF in the SIBE is defined is determined according to an actual condition. For example, when the length of the TPBF is three bits, and the length of the SIBF is five bits, N1 is equal to 3, and N2 may be equal to 31 (the maximum value of the SIBF) or 34 (where, because if N1 is 3, the SIBF skips at least three indication bits, a range of a value that the SIBF can indicate may be defined to 3 to 34); or, when the length of the TPBF is seven bits, and the length of the SIBF is six bits, N1 is equal to 7, and N2 may be equal to 63 (the maximum value of the SIBF) or 70 (where, in this case, because the SIBF skips at least seven indication bits, a range of a value that the SIBF can indicate may be defined to 7 to 70) or a value between 63 and 70. As can be seen, the exemplified compression manner is a manner that mainly compresses consecutive second-value indication bits (that is, compresses consecutive specific-value indication bits) and may not compress consecutive first-value indication bits.

The lengths of the sub-elements in the compressed IM may be set according to a specific requirement, so as to meet different compression requirements. For example, each TPBE may occupy one byte, each SIBF may occupy one byte, and each IBOF may occupy two bytes. Certainly, each TPBE, each SIBF, and each IBOF may also occupy more or less bytes or bits, respectively.

In an embodiment of the present invention, for an indication bit behind consecutive indication bits with the same value that are skipped by each SIBF in the original IM, if a value of the indication bit can be deducted (for example, it may be deducted that the value of the indication bit is inverse to that of the consecutive indication bits with the same value), the indication bit may be or not be compressed to one or more other sub-elements of the compressed IM (where not compressing the indication bit can improve the IM compression efficiency); if the value of the indication bit cannot be deducted, the indication bit is compressed to one or more other sub-elements of the compressed IM (for example, compressed to a subsequent TPBE). Similarly, for an indication bit corresponding to an indication bit serial number indicated by each IBOF in the original IM, if a value of the indication bit can be deducted (for example, it may be deducted that the value of the indication bit is inverse to that of the consecutive indication bits with the same value), the indication bit may be or not be compressed to one or more other sub-elements of the compressed IM; if the value of the indication bit cannot be deducted, the indication bit is compressed to one or more other sub-elements of the compressed IM (for example, compressed to a subsequent TPBE).

In a feasible implementation manner, if the compressed IM includes the TPBE and the SIBE, the TPBE type indication field of the TPBE may occupy one bit, and the SIBE type indication field in the SIBE may occupy one bit. Or, if the compressed IM includes the TPBE and the IBOE, the TPBE type indication field in the TPBE may occupy one bit, and the IBOE type indication field in the IBOE may occupy one bit. Or, if the compressed IM includes the SIBE and the IBOE, the SIBE type indication field in the SIBE may occupy one bit, and the IBOE type indication field in the IBOE may occupy one bit. Or, if the compressed IM includes the TPBE, the SIBE, and the IBOE, the TPBE type indication field in the TPBE may occupy one bit, the SIBE type indication field in the SIBE may occupy two bits, and the IBOE type indication field in the IBOE may occupy two bits. Or, if the compressed IM includes the TPBE, the SIBE, and the IBOE, the TPBE type indication field of the TPBE may occupy two bits, the SIBE type indication field of the SIBE may occupy one bit, and the IBOE type indication field in the IBOE may occupy two bits. Or, if the compressed IM includes the TPBE, the SIBE, and the IBOE, the TPBE type indication field of the TPBE may occupy two bits, the SIBE type indication field of the SIBE may occupy two bits, and the IBOE type indication field in the IBOE may occupy one bit.

It may be understood that, in a case in which the original IM is compressed by using only two sub-elements, for example, using only the TPBE and the SIBE, or using only the TPBE and the IBOE, only one bit is required in the sub-element type indication field in each sub-element for distinguishing the two sub-elements.

Figure 1C:
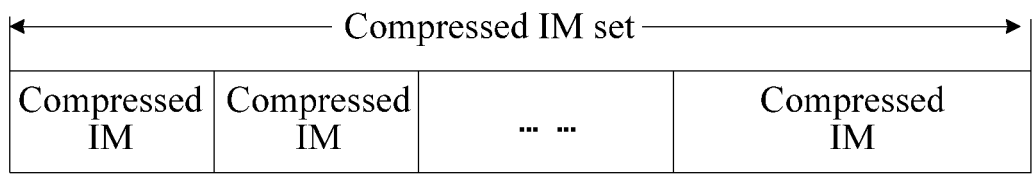
FIG. 1C is a schematic diagram of a compressed IM set according to an embodiment of the present invention.
Figure 1D:
FIG. 1D is a schematic diagram of another compressed IM set according to an embodiment of the present invention.

In another embodiment of the present invention, if the original IM is one group of a primary original IM (where as shown in FIG. 1B, the primary original IM includes several indication bit groups, and each indication bit group serves as one original IM), that is, the primary original IM includes multiple original IMs, and if the wireless access device combines compressed IMs corresponding to at least two groups (namely, at least two original IMs) of each primary original IM as one compressed IM set for sending (where IMs in the compressed IM set may all be compressed IMs (such as a case shown in FIG. 1C), or both a compressed IM and an original IM exist (such as a case shown in FIG. 1D)), in this case, each compressed IM in the compressed IM set may further include a group start sub-element (GSE), where the GSE indicates the start of the compressed IM, and the GSE may be located at, for example, the start position of each compressed IM, so that the decompression end can know the start of the compressed IM. In addition, if the compressed IM set further includes an original IM (that is, an indication bit group, not compressed), a GSE may also be added at the start position of the original IM, so as to indicate the start of the original IM. Certainly, values of the GSE at the start position (or other determined positions) of the compressed IM and the GSE at the start position (or other determined positions) of the original IM are different for distinguished indications. The decompression end can know the start of each original IM or each compressed IM in the received compressed IM set accordingly, so as to perform corresponding decompression processing.

A person skilled in the art may understand that, the sub-element type indication fields of the sub-elements in the compressed IM may be set at the same positions of the sub-elements (for example, the same starting positions or the same end positions, for example, the sub-element type indication fields of the sub-elements may be respectively set at the start positions of the sub-elements), so that the decompression end respectively determines types of the sub-elements according to values of bits at the positions where the sub-element type indication fields of the sub-elements are located. In a case in which a sub-element type indication field has more than one bit, the bits of the sub-element type indication field may be not consecutive, but at least one of the bits is at the same position as a bit of the sub-element type indication field of a sub-element whose sub-element type indication field has only one bit, and other bits should also be located at determined positions, so that the decompression end respectively determines types of the sub-elements according to values of bits at the positions where the sub-element type indication fields of the sub-elements are located.

It may be understood that, in the embodiment of the present invention, the wireless access device may be an access point, a base station, or other network entities having a wireless access function.

In an embodiment of an indication operation method of the present invention, the method includes: receiving, by a mobile device, a compressed IM, where the compressed IM includes at least one of a TPBE, an SIBE, and an IBOE, where the TPBE includes a TPBF and a TPBE type indication field, and the TPBF is used for indicating a segment with a set length from a compress start position corresponding to the TPBE in an original IM corresponding to the compressed IM; the SIBE includes an SIBF and an SIBE type indication field, and the SIBF is used for indicating the number of skipped consecutive indication bits with the same value from a compress start position corresponding to the SIBE in the original IM; and the IBOE includes an IBOF and an IBOE type indication field, and the IBOF is used for indicating an indication bit serial number corresponding to an indication bit behind skipped consecutive indication bits with the same value from a compress start position corresponding to the IBOE in the original IM; determining, by the mobile device by decompressing the compressed IM, a value of an indication bit corresponding to an indication bit serial number corresponding to the mobile device in the original IM; and if the value of the indication bit corresponding to the indication bit serial number corresponding to the mobile device indicates that the mobile device needs to execute an indicated operation, executing, by the mobile device, the indicated operation.

Referring to FIG. 2, an indication operation method provided by an embodiment of the present invention may include the following steps.

201: A mobile device receives a compressed IM.

If a wireless access device bears the compressed IM in a beacon frame, so as to send the compressed IM through the beacon frame, the mobile device may receive the compressed IM by receiving the beacon frame. Certainly, if the wireless access device sends the compressed IM through another broadcast frame, the mobile device may receive the compressed IM by receiving the broadcast frame bearing the compressed IM, and on the rest may be deduced by analog.

The wireless access device may generate the compressed IM by using multiple sub-elements (where the multiple sub-elements may include an SIBE, an IBOE, and a TPBE, and certainly may further include other sub-elements of other types). The compressed IM may include at least one sub-element, and the at least one sub-element may include the SIBE, the IBOE, and the TPBE and the like (where a decompression order of the sub-elements included in the compressed IM may be agreed on between a compression end and a decompression end or notified by one end to the other end, and the decompression order may be, for example, a left-to-right order or a right-to-left order). The TPBE includes a TPBF and a TPBE type indication field, and the TPBF is used for indicating a segment with a set length from a compress start position corresponding to the TPBE in an original IM corresponding to the compressed IM; the SIBE includes an SIBF and an SIBE type indication field, and the SIBF is used for indicating the number of skipped consecutive indication bits with the same value from a compress start position corresponding to the SIBE in the original IM; and the IBOE includes an IBOF and an IBOE type indication field, and the IBOF is used for indicating an indication bit serial number corresponding to an indication bit behind skipped consecutive indication bits with the same value from a compress start position corresponding to the IBOE in the original IM.

Different indication bits in the IM may have different indication bit serial numbers, for example, an indication bit serial number corresponding to each indication bit of a TIM may be an association identifier, an association identifier offset, or the like.

202: The mobile device determines, by decompressing the compressed IM, a value of an indication bit corresponding to an indication bit serial number corresponding to the mobile device in the corresponding original IM; and if the value of the indication bit corresponding to the indication bit serial number corresponding to the mobile device indicates that the mobile device needs to execute an indicated operation, the mobile device executes the indicated operation.

For example, assuming that the compressed IM is a compressed TIM, the mobile device may determine, by decompressing the compressed TIM, a value of an indication bit corresponding to an indication bit serial number corresponding to the mobile device in a corresponding original TIM; and if the value of the indication bit corresponding to the indication bit serial number corresponding to the mobile device indicates that the mobile device has downlink data, the mobile device acquires the downlink data.

It may be understood that, the mobile device may decompress the sub-elements in the compressed IM according to decompression manners corresponding to the sub-elements of the types in the compressed IM. After the mobile device determines, by decompressing the compressed IM, the value of the indication bit corresponding to the indication bit serial number corresponding to the mobile device in the original IM, even though the compressed IM is not completely decompressed, the mobile device may also stop decompressing the compressed IM.

As can be seen, in this embodiment, the compressed IM generated by the wireless access device includes at least one of the TPBE, the SIBE, and the IBOE, where the TPBE includes a TPBF and a TPBE type indication field, and the TPBF is used for indicating a segment with a set length from a compress start position corresponding to the TPBE in the original IM corresponding to the compressed IM; the SIBE includes an SIBF and an SIBE type indication field, and the SIBF is used for indicating the number of skipped consecutive indication bits with the same value from a compress start position corresponding to the SIBE in the original IM; and the IBOE includes an IBOF and an IBOE type indication field, and the IBOF is used for indicating an indication bit serial number corresponding to an indication bit behind skipped consecutive indication bits with the same value from a compress start position corresponding to the IBOE in the original IM. In this way, consecutive indication bits with the same value corresponding to positions in the original IM can be compressed into the SIBE, the IBOE, or the like, and the mobile device that receives the compressed IM can determine the value of the indication bit corresponding to the indication bit serial number corresponding to the mobile device in the original IM, and further execute the corresponding indicated operation according to the value. As can be seen, the IM compression mechanism provided in the embodiment of the present invention facilitates improvement of compression efficiency of an IM, and further reduces radio air interface resources occupied for sending the IM and improves IM sending efficiency.

For better understanding and implementing the solution of the embodiment of the present invention, exemplified description is mainly made in the following by taking an application scenario of TIM compression as an example. In this embodiment, description is made through an example where each indication bit occupies one bit, that is, each bit in an original TIM is one indication bit, a scenario where each indication bit occupies multiple bits may be deducted by analogy, and solutions for compressing other IMs may be deducted by analogy.

Figure 3:
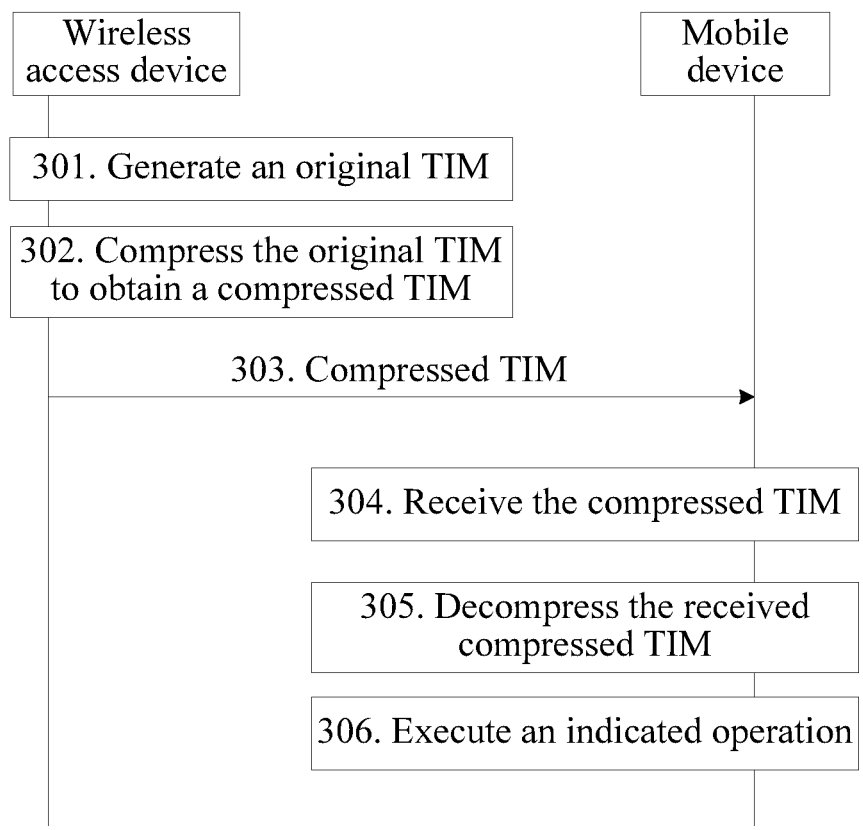
FIG. 3 is a schematic diagram of another downlink data acquisition method according to an embodiment of the present invention.

Referring to FIG. 3, a downlink data acquisition method provided by an embodiment of the present invention may include the following steps:

301: A wireless access device generates an original TIM.

302: The wireless access device obtains a compressed TIM by compressing the original TIM.

Figure 4A:
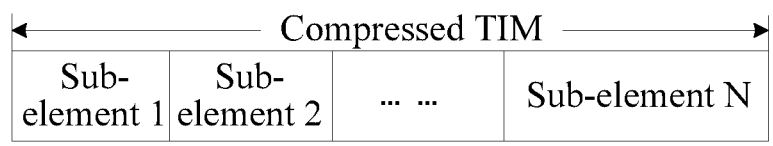
FIG. 4A is a schematic diagram of a compressed TIM according to an embodiment of the present invention.

As shown in FIG. 4A, the wireless access device may, for example, use multiple sub-elements to compress the original TIM into a compressed TIM that includes at least one sub-element, and a decompression end may restore, by using the sub-elements in the compressed TIM, partial segments of the original TIM whose lengths are the same or different.

In this embodiment, description structures of several sub-elements used for compressing the original TIM are defined through examples.

Figure 4B:
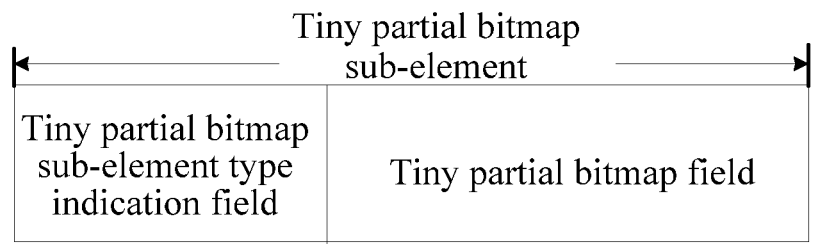
FIG. 4B is a schematic diagram of a tiny partial bitmap sub-element according to an embodiment of the present invention.

TPBE: As shown in FIG. 4B, the TPBE may include a TPBE type indication field and a TPBF.

The TPBE type indication field is used for indicating that a type of the sub-element is the TPBE.

The TPBF is used for indicating a partial segment (for example, a segment of three bits, seven bits, or another length) with a set length from a start position corresponding to the TPBE in the original TIM, where information carried by the TPBF may be information that can indicate the partial segment with the set length from the start position corresponding to the TPBE in the original TIM. Certainly, this segment is not compressed by using other sub-elements any more. For example, the TPBF may include a copied partial segment with the set length from the start position corresponding to the TPBE in the original TIM, or may include a value obtained by performing a specific operation for the partial segment (where the specific operation is, for example, agreed on between the compression end and the decompression end in advance, or notified by the compression end to the decompression end or notified by the decompression end to the compression end).

In an actual application, the length of a single TPBE may be set to, for example, one byte (eight bits).

Figure 4C:
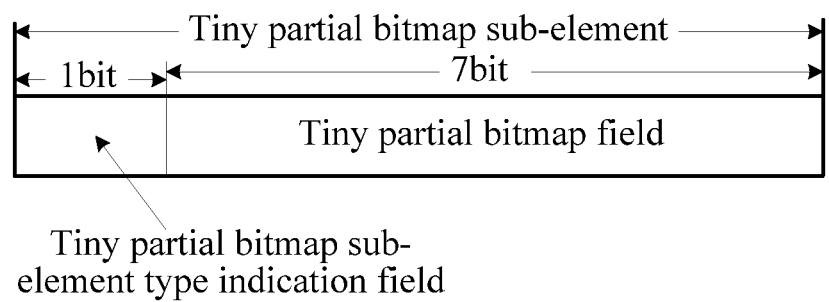
FIG. 4C is a schematic diagram of another tiny partial bitmap sub-element according to an embodiment of the present invention.

For example, as shown in FIG. 4C, bit 0 of the TPBE may serve as the TPBE type indication field (for example, if a value of a sub-element type indication field (bit 0) of a sub-element is 0, it indicates that the sub-element is the TPBE), and other seven bits (bit 1 to bit 7) serve as the TPBF. If a 0-value bit is compressed, if, from a start indication bit to be compressed, the number of consecutive 0-value bits does not exceed 7, the optimal compression effect cannot be achieved by using other sub-elements, and one TPBE that includes seven consecutive indication bits from the start indication bit to be compressed is used. In this case, seven bits being all 0-value bits does not occur in the TPBF, and accordingly a case where all bits of the TPBF in the TPBF are "0"s may be used as a value of a GSE, to indicate the start of a group.

It may be understood that, the length of the TPBE certainly may also be set to two bytes (16 bits) or four bits or another length. A positional relationship between the TPBE type indication field and the TPBF in the TPBE is also not limited to the foregoing example. For example, the TPBF may be located before the TPBE type indication field, or the TPBE type indication field may be inserted in the TPBF. A person skilled in the art may understand that, the sub-element type indication fields of the sub-elements in the compressed TIM may be set at the same positions of the sub-elements (for example, the same starting positions or the same end positions, for example, the sub-element type indication fields of the sub-elements may be respectively set at the start positions of the sub-elements), so that the decompression end respectively determines types of the sub-elements according to values of bits at the positions where the sub-element type indication fields of the sub-elements are located.

Figure 4D:
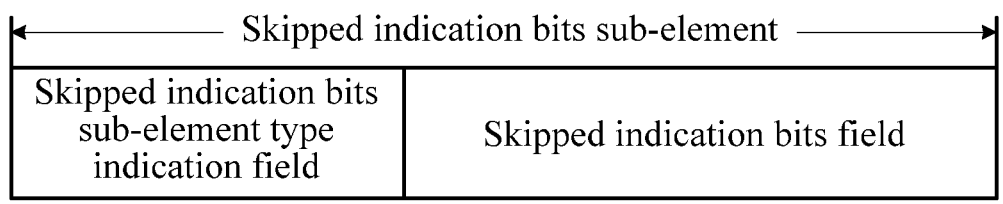
FIG. 4D is a schematic diagram of a skipped indication bits sub-element according to an embodiment of the present invention.

SIBE: As shown in FIG. 4D, the SIBE may include an SIBE type indication field and an SIBF.

The SIBE type indication field is used for indicating that a type of the sub-element is the SIBE.

The SIBF is used for indicating the number of skipped consecutive indication bits with the same value (for example, consecutive 1-value bits or 0-value bits) from a start position corresponding to the SIBE in the original TIM, where information carried by the SIBF may be any information that can indicate the number of the skipped consecutive indication bits with the same value from the start position corresponding to the SIBE in the original TIM. For example, a numerical value (for example, K1) carried by the SIBF is equal to the number of the skipped consecutive indication bits with the same value from the start position corresponding to the SIBE in the original TIM; or a value obtained by performing a specific operation on the numerical value (for example, K1) carried by the SIBF and one or more parameters (where the parameters may be agreed on between the compression end and the decompression end, or notified by the compression end to the decompression end or notified by the decompression end to the compression end) is equal to the number of the skipped consecutive indication bits with the same value from the start position corresponding to the SIBE in the original TIM. For example, the obtained value is K1*y1. In this case, if y1 is equal to 1, it indicates that the numerical value K1 carried by the SIBF is equal to the number of the skipped consecutive indication bits with the same value from the start position corresponding to the SIBE in the original TIM; if y1 is equal to 8, it indicates that the numerical value carried by the SIBF is equal to the number of skipped consecutive indication bit groups with the same value from the start position corresponding to the SIBE in the original TIM (where the number K1 of the indication bit groups multiplied by 8 is equal to the number of the skipped consecutive indication bits with the same value from the start position corresponding to the SIBE in the original TIM); and a case where y1 is equal to other values is similar to that. That is to say, the numerical value carried by the SIBF can indicate the number of the skipped consecutive indication bit groups (where each bit group includes y1 indication bits, and y1 is a positive integer such as 1, 2, 3, and other positive integers) with the same value from the start position corresponding to the SIBE in the original TIM, which, certainly, is equivalent to that the numerical value carried by the skipped indication bits field indirectly indicates the number of the skipped consecutive indication bits with the same value from the start position corresponding to the SIBE in the original TIM.

For example, if a value of a skipped indication bit in the original TIM is "0", in a case in which the number of consecutive 0-value indication bits is less than 7 (assuming that the length of the TPBF of the TPBE is seven bits), compression is performed by using the TPBE. In this way, a case where the number of consecutive 0-value indication bits is less than 7 does not occur in the SIBE. Assuming that the length of the SIBF of the SIBE is six bits, a value of the SIBF ranges from 0 to 63. In this case, for example, 0 (namely, binary "000000") may be used to indicate that seven consecutive 0-value indication bits in the original TIM are skipped, 1 is used to indicate eight consecutive 0-value indication bits, and so on, and 63 indicates 70 consecutive 0-value indication bits. Therefore, in this case (where the length of the TPBF is seven bits, and the length of the SIBF is six bits), the SIBF of the SIBE can indicate that the number of skipped consecutive 0-value indication bits is 7 to 70. Certainly, 0 (namely, binary "000000") may also be used to indicate 64 consecutive 0-value indication bits, 1 indicates 65 consecutive 0-value indication bits, and so on, and 6 indicates 70 consecutive 0-value indication bits, and another value indicates consecutive 0-value indication bits whose number is the another value. Or, the values 0 to 6 of the SIBF may also be not used, for example, a value of the SIBF indicates that consecutive 0-value indication bits whose number is the value are skipped. However, a case where a value of the SIBF in the SIBE is one or two of the values 0 to 6 may be defined as a value of the GSE, that is, the SIBE in a case in which a value of the SIBE is a special value is taken as a GSE.

In an actual application, the length of a single SIBE may be set to, for example, one byte (eight bits).

Figure 4E:
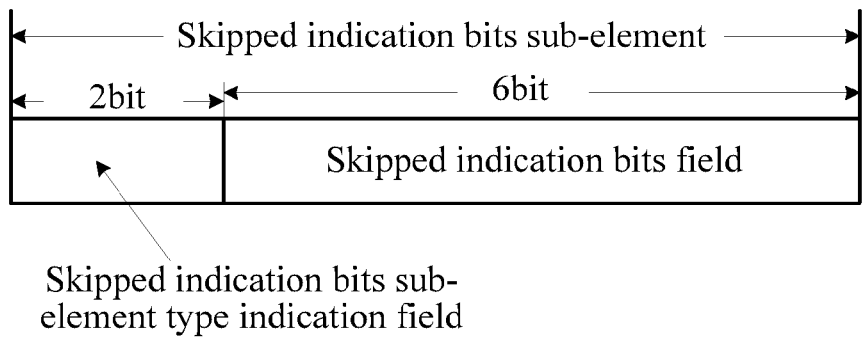
FIG. 4E is a schematic diagram of another skipped indication bits sub-element according to an embodiment of the present invention.

For example, as shown in FIG. 4E, bit 0 and bit 1 of the SIBE may serve as the SIBE type indication field (for example, if a value of a sub-element type indication field of a sub-element is binary "10", it indicates that the sub-element is the SIBE), and other six bits serve as the SIBF.

It may be understood that, the length of the SIBE definitely may also be set to two bytes (16 bits) or 10 bits or another length. A positional relationship between the SIBE type indication field and the SIBF in the SIBE is also not limited to the foregoing example. For example, the SIBF may be located before the SIBE type indication field, or the SIBE type indication field may be inserted in the SIBF.

Figure 4F:
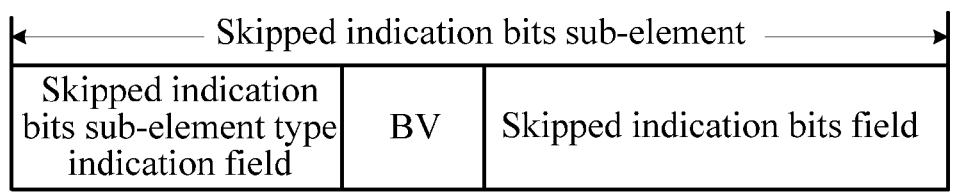
FIG. 4F is a schematic diagram of another skipped indication bits sub-element according to an embodiment of the present invention.
Figure 4G:
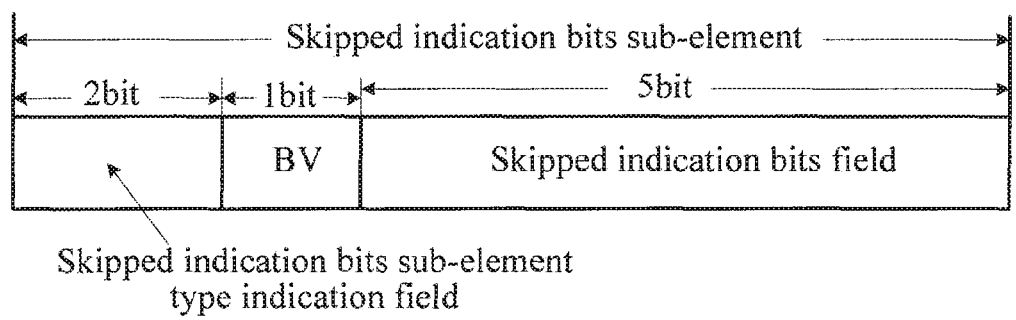
FIG. 4G is a schematic diagram of another skipped indication bits sub-element according to an embodiment of the present invention.

Furthermore, as shown in FIG. 4F, in addition to the SIBE type indication field and the SIBF, the SIBE may further include a skipped indication BV field, where the BV field is used for indicating values of the skipped consecutive indication bits with the same value from the start position corresponding to the SIBE in the original TIM. In this case, the information carried by the SIBF indicates the number of skipped consecutive indication bits whose values are the values indicated by the BV field from the start position corresponding to the SIBE in the original TIM. For example, as shown in FIG. 4G, bit 2 of the SIBE may serve as the BV field. For example, if a value of the BV field of the SIBE is "1", it indicates that the skipped consecutive indication bits from the start position corresponding to the SIBE in the original TIM are 1-value indication bits, that is, the information carried by the SIBF indicates the number of the skipped consecutive 1-value indication bits from the start position corresponding to the SIBE in the original TIM; if a value of the BV field of the SIBE is "0", it indicates that skipped consecutive indication bits from the start position corresponding to the SIBE in the original TIM are 0-value indication bits, that is, the information carried by the SIBF indicates the number of the skipped consecutive 0-value indication bits from the start position corresponding to the SIBE in the original TIM, and so on.

Figure 4H:
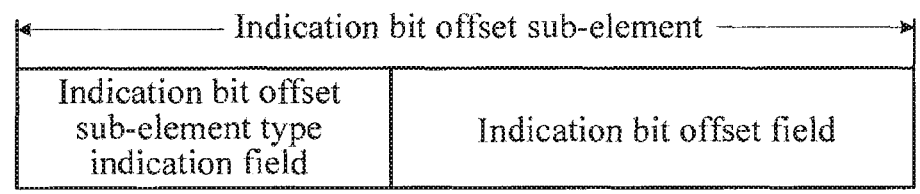
FIG. 4H is a schematic diagram of an indication bit offset sub-element according to an embodiment of the present invention.

IBOE: As shown in FIG. 4H, the IBOE may include an IBOE type indication field and an IBOF.

The IBOE type indication field is used for indicating that a type of the sub-element is the IBOE.

The IBOF is used for indicating an indication bit serial number corresponding to a bit behind skipped consecutive indication bits with the same value from a start position corresponding to the IBOE in the original TIM.

Information carried by the IBOF may be any information that can indicate the indication bit serial number corresponding to the bit behind the skipped consecutive indication bits with the same value from the start position corresponding to the IBOE in the original TIM. For example, a numerical value (for example, K2) carried by the IBOF is equal to the indication bit serial number corresponding to the bit behind the skipped consecutive indication bits with the same value from the start position corresponding to the IBOE in the original TIM; or a value obtained by performing a specific operation on the numerical value (for example, K2) carried by the IBOF and one or more parameters (where the parameters may be agreed on between the compression end and the decompression end, or notified by the compression end to the decompression end) (for example, K2+y2, where a case of another parameter and operation manner is similar) is equal to the indication bit serial number corresponding to the bit behind the skipped consecutive indication bits with the same value from the start position corresponding to the IBOE in the original TIM.

For example, assuming that an indication bit serial number (for example, an AID) of the first bit (whose index is 0) of the original TIM is 0 (where a serial number offset is also 0), if the length of the original TIM is 6000 indication bits in total, an indication bit serial number of the last indication bit is 5999 (where a serial number offset is also 5999). In an actual application, the wireless access device may also perform group management on mobile devices, for example, the wireless access device may divide the 6000 mobile devices into three groups, each group has 2000 mobile devices, values of indication bit serial numbers corresponding to the first mobile device group ranges from 0 to 1999, values of indication bit serial numbers corresponding to the second mobile device group ranges from 2001 to 3999, and values of indication bit serial numbers corresponding to the third mobile device group ranges from 4001 to 5999. In this case, the wireless access device may generate, corresponding to each mobile device group, an original TIM with the length of 2000 indication bits, and then compress the original TIM of each group, and accordingly, in the original TIM of each group, a value of a serial number offset ranges from 0 to 1999, that is, an AID of each indication bit in the TIM is equal to an offset of the indication bit in the original TIM (for example, a TIM including 2000 indication bits) of the group plus an offset of the original TIM of the group in a primary original TIM (for example, a TIM including 6000 indication bits), where the offset of the original TIM of the group in the primary original TIM is equal to an AID corresponding to the first bit of the original TIM of the group. Indicating a serial number offset of an indication bit in an original TIM is indicating an indication bit serial number of the indication bit, where the indication bit serial number of the indication bit can be deducted according to the serial number offset of the indication bit.

In an embodiment of the present invention, the length of a single IBOE may be set to, for example, two bytes (16 bits), or the length of the IBOE may also be set to 14 bits according to the value range of an indication bit serial number or a serial number offset.

Figure 4I:
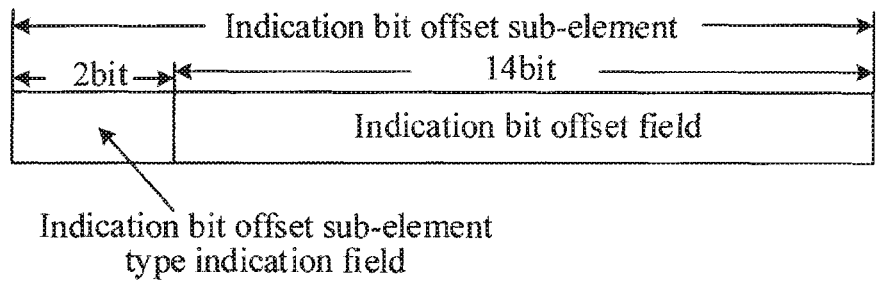
FIG. 4I is a schematic diagram of another indication bit offset sub-element according to an embodiment of the present invention.

For example, as shown in FIG. 4I, bit 0 and bit 1 of the IBOE may serve as the IBOE type indication field (for example, if a value of a sub-element type indication field of a sub-element is binary "11", it indicates that the sub-element is the IBOE), and other 14 bits serve as the IBOF. Actually, only 13 bits are required for 6000 mobile devices, and if the length of an original TIM is actually 2000 bits only (for example, 6000 mobile devices are divided into three groups), the IBOF requires only 11 bits. Therefore, the length of the IBOE may also be defined to 13 bits (where two bits for the IBOE type indication field are added).

It may be understood that, the length of the IBOE definitely may also be set to three bytes (24 bits) or a length of bits of another number. A positional relationship between the IBOE type indication field and the IBOF in the IBOE is also not limited to the foregoing example, which may also be other positional relationships agreed on between the compression end and the decompression end. For example, the IBOF may be located before the IBOE type indication field, or the IBOE type indication field may be located in the IBOF.

Figure 4J:
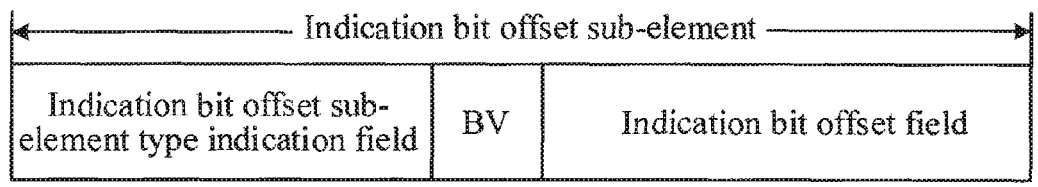
FIG. 4J is a schematic diagram of another indication bit offset sub-element according to an embodiment of the present invention.

Furthermore, as shown in FIG. 4J, in addition to the IBOE type indication field and the IBOF, the IBOE may further include a skipped indication BV field, where the BV field is used for indicating values (for example, "0"s or "1"s) of the skipped consecutive indication bits with the same value from the start position corresponding to the IBOE in the original TIM. In this case, the information carried by the IBOF of the IBOE indicates the indication bit serial number corresponding to the indication bit behind skipped consecutive indication bits whose values are the values indicated by the BV field from the start position corresponding to the IBOE in the original TIM.

Figure 4K:
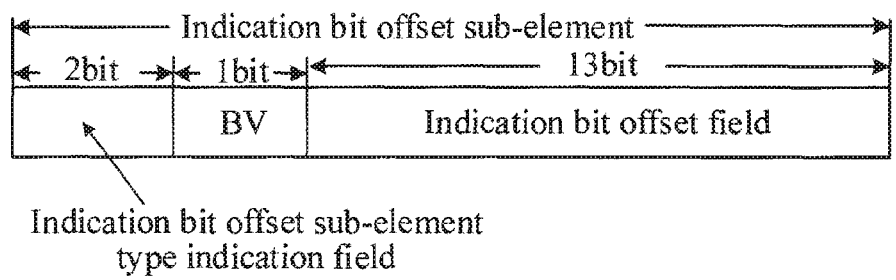
FIG. 4K is a schematic diagram of another indication bit offset sub-element according to an embodiment of the present invention.

For example, as shown in FIG. 4K, bit 2 of the IBOE may serve as the BV field. For example, if a value of the BV field of the IBOE is "1", it indicates that consecutive 1-value indication bits are skipped from the start position corresponding to the IBOE in the original TIM, that is, the information carried by the IBOF of the IBOE indicates the indication bit serial number corresponding to the indication bit (where the indication bit may be a 0-value indication bit or a 1-value indication bit) behind the skipped consecutive 1-value indication bits from the start position corresponding to the IBOE in the original TIM; if a value of the BV field of the IBOE is "0", it indicates that consecutive 0-value indication bits are skipped from the start position corresponding to the IBOE in the original TIM, that is, the information carried by the IBOF of the IBOE indicates the indication bit serial number corresponding to the indication bit behind the skipped consecutive 0-value indication bits from the start position corresponding to the IBOE in the original TIM, and so on.

In an embodiment of the present invention, in a case in which 1-value indication bits (or 0-value indication bits) are distributed sparsely in an original TIM, it may also consider that the 1-value indication bits (or the 0-value indication bits) are not compressed, and 0-value indication bits (or 1-value indication bits) are mainly compressed. In this case, the SIBE and/or the IBOE used for compressing the original TIM may not include a BV field, and consecutive 0-value indication bits (or 1-value indication bits) are skipped by default, so as to improve the compression efficiency. In a case in which 1-value indication bits (or 0-value indication bits) are distributed intensively in an original TIM, the SIBE and/or the IBOE used for compressing the original TIM may include or not include a BV field.

Multiple manners are further available for indicating whether an SIBE and/or an IBOE in a compressed TIM includes a BV field.

For example, if a proportion occupied by 1-value indication bits (or 0-value indication bits) in the original TIM is less than a set value A (for example, 5%, 10%, or other values), it may consider that the 1-value indication bits (or the 0-value indication bits) are distributed sparsely in the original TIM. In this case, the SIBE and/or the IBOE used for compressing the original TIM may not include the BV field, and 0-value indication bits (or 1-value indication bits) are compressed by default. If a proportion occupied by 1-value indication bits (or 0-value indication bits) in the original TIM exceeds a set value B (for example, 90%, 95%, or other values), it may consider that the 1-value indication bits (or the 0-value indication bits) are distributed too intensively in the original TIM, that is, 0-value indication bits (or 1-value indication bits) are distributed sparsely. In this case, the SIBE and/or the IBOE used for compressing the original TIM may not include the BV field, and the 1-value indication bits (or the 0-value indication bits) are compressed by default. In addition, if a proportion occupied by 1-value indication bits (or 0-value indication bits) in the original TIM is greater than A and less than B, it may consider that the density of the 1-value indication bits (or the 0-value indication bits) in the original TIM is moderate. In this case, the SIBE and/or the IBOE used for compressing the original TIM may include the BV field, so as to indicate that each SIBE and/or IBOE compresses consecutive 0-value indication bits or consecutive 1-value indication bits.

In an embodiment of the present invention, if it is considered to compress only the 0-value indication bits in the original TIM, assuming that the SIBE and the TPBF each are one byte, and the IBOE are two bytes, and the SIBE and the IBOE may not include the BV field, the wireless access device may follow one or more of the following rules when compressing the original TIM:

For example, in a case in which the number of consecutive 0-value indication bits exceeds six (which means that a case where seven indication bits in the TPBF in the TPBE are all 0s does not occur, that is, the TPBF in the TPBE has at least one 1-value indication bit) but does not exceed 64 (namely, seven to 64, 58 possibilities in total, where the meaning of a value of the TPBF being 0 may be defined as indicating that 64 indication bits are skipped) or 70 (namely, seven to 70, 64 possibilities in total), the SIBE is used to skip the consecutive 0-value indication bits, and the first 1-value indication bit encountered afterward may be not included in a subsequent sub-element as it can be directly deducted that the indication bit behind the consecutive 0-value indication bits skipped by the SIBE should be a 1-value indication bit (herein, the first 1-value indication bit may also be included in a subsequent sub-element, and accordingly the subsequent sub-element is a TPBE, which, however, will not improve the compression efficiency, for example, if many 0-value indication bits may exist behind the 1-value indication bit, the TPBE does not need to be used, and the SIBE or the IBOE may continue to be used to compress the 0-value indication bits behind the 1-value indication bit); however, if the IBOE sub-element is not involved in compressing the original TIM, because of a case where consecutive 0-value indication bits of all lengths cannot be skipped by using the SIBE, it does not consider that the indication bit behind the SIBE sub-element is definitely a 1-value indication bit.

In a case in which the number of 0-value indication bits exceeds 64 (>64) or 70 (>70), the IBOE may be used to directly indicate an indication bit serial number corresponding to a next 1-value indication bit, that is, consecutive 0-value indication bits are directly skipped, and the 1-value indication bit may be not compressed to a subsequent sub-element, because it can be directly deducted that the indication bit corresponding to the indication bit serial number indicated by the IBOE is a 1-value indication bit, and consecutive 0-value indication bits are skipped before the 1-value indication bit.

If all rear indication bits are 0-value indication bits, the indication bits may be not compressed by using any sub-element but directly discarded.

Other cases are cases where compression may be not performed. In such cases, the indication bits may be copied to the TPBF of the TPBE by using the TPBE, and each seven consecutive indication bits in the original TIM is indicated by using one TPBE.

Particularly, if the last sub-element after compression is the TPBE, but a remaining segment of the original TIM is less than seven indication bits, "0" may be filled in a spare indication bit in the TPBE.

The following provides description through several examples.

Example 1

In a case in which the original TIM is "0000,0010; 0000 . . . " (where "," and ";" are added for ease of reading, which are not mandatory in the original TIM, and the same goes in the following), "0000001" will be compressed into one TPBE, that is, "0,0000001", where the first "0" indicates that the sub-element is the TPBE, and seven bits "0000001" behind are a segment copied from the original TIM.

Example 2

In a case in which the original TIM is "0000,0001;0011, 0000 . . . ", "0000000" may be compressed into one SIBE, and "0011000" may be compressed into one TPBE, that is, "10, 111000;0,0011000", where the first two bits "10" of the first byte "10,111000" indicate that the sub-element is an SIBE, and values of six bits behind are 7 (where a least significant bit is located before a most significant bit), which indicates that seven 0-value indication bits are skipped, and an indication bit behind the indication bits is a 1-value indication bit, which does not need to be compressed to a subsequent sub-element; the first bit of the second byte "0,0011000" is "0", which indicates that the sub-element is a TPBE, and "0011000" behind is a segment copied from the original TIM. Herein, the last indication bit of the first byte in the original TIM is a 1-value indication bit, which is not included in a the subsequent TPBE, because the first SIBE sub-element shows that the indication bit behind is a 1-value indication bit while indicating that the first seven 0-value indication bits are skipped. Even though the 1-value indication bit is not included in the subsequent TPBE, the decompression end can also deduct that the bit is a 1-value indication bit. Certainly, in an actual application, the 1-value indication bit may also be included in the subsequent TPBE instead of ignoring it.

Example 3

If the original TIM includes "0100,0000;<values of bits of 20 consecutive bytes (160 bit) are all 0s>;0010,0000;0000, 1000", "0100,000" may be compressed into one TPBE; "0;<values of bits of 10 consecutive bytes are all 0s>;00" is compressed into one IBOE; and "0,0000;0000" is compressed into one SIBE; where the compressed TIM includes "0,0100000;11,010101;0100,0000;10,100100", where the first bit of the first byte "0,0100000" is "0", which indicates that the sub-element is a TPBE, seven bits behind are the first seven indication bits in the original TIM, the first two bits of the second byte "11,010101" are "11", which indicates that the sub-element is an IBOE, and the remaining six bits of the byte plus eight bits "0100,0000" of the next byte, a total of 14 (6+8) bits "01010101000000" (where a least significant bit is located before a most significant bit), indicates an indication bit serial number or a serial number offset corresponding to the next 1-value indication bit behind the position where the IBOE ends, that is, 170 in decimal mode. Herein, it is not required to add one TPBE behind the IBOE to compress the 1-value indication bit whose indication bit serial number or serial number offset is 170; the first two bits of the still next byte is "10", which indicates that the sub-element is an SIBE, six bits "100100" behind (where a least significant bit is located before a most significant bit) are 9 in decimal mode, which indicates that nine 0-value indication bits are skipped. Certainly, the 1-value indication bit behind the nine 0-value indication bits in the original TIM does not need to be included in any subsequent sub-element, and even so, it can be deducted that the value of the indication bit is "1". Certainly, in an actual application, the 1-value indication bit may also be included in the subsequent TPBE instead of ignoring it.

It may be understood that, a case in which it is considered to compress 0-value indication bits only is similar to a case in which it is considered to compress 1-value indication bits only, which is not described herein again.

In another embodiment of the present invention, if it is considered to compress both 0-value indication bits and 1-value indication bits in the original TIM, assuming that the SIBE and the TPBF each are one byte, the IBOE is two bytes, and the SIBE and the IBOE each include a BV field, the wireless access device may follow, for example, the following rules when compressing the original TIM:

If the number of consecutive indication bits with the same value exceeds six but does not exceed 32 (that is, seven to 32) or 38 (that is, seven to 38), the consecutive indication bits with the same value are compressed by using the SIBE, where the BV field of the SIBE indicates values of the skipped consecutive indication bits with the same value corresponding to the SIBE, and the indication bit, behind the consecutive indication bits with the same value, whose value is different from the values indicated by the BV may be not included in a subsequent sub-element, because the SIBE shows that the indication bit behind is an indication bit whose value is different from those of the consecutive indication bits with the same value while indicating the skipped consecutive indication bits with the same value. If the values of the consecutive indication bits with the same value before are "1"s, it indicates that the indication bit behind the consecutive indication bits with the same value is a 0-value indication bit; if the values of the consecutive indication bits with the same value before are "0"s, it indicates that the indication bit behind the consecutive indication bits with the same value is a 1-value indication bit; if the number of consecutive indication bits with the same value exceeds 32 (>32) or 38 (>38), an indication bit serial number corresponding to a next indication bit whose value is different from those of the consecutive indication bits with the same value is directly indicated by using the IBOE, values of the indication bits with the same value are indicated by using the BV field, and the indication bit (where the value of the indication bit is different from the values indicated by the BV field) corresponding to the indication bit serial number indicated by the IBOE is not included in a subsequent sub-element, because it can be directly deducted that the value of the indication bit corresponding to the indication bit serial number indicated by the IBOE is different from the values of the skipped consecutive indication bits with the same value before. If the values of the consecutive indication bits with the same value before are "1"s, it indicates that the indication bit corresponding to the indication bit serial number indicated by the IBOE is a 0-value indication bit; if the values of the consecutive indication bits with the same value before are "0"s, it indicates that the indication bit corresponding to the indication bit serial number indicated by the IBOE is a 1-value indication bit.

If all rear indication bits are 0-value indication bits, the indication bits may be not compressed by using any sub-element but directly discarded.

Other cases are cases where compression may be not performed. In such cases, the indication bits may be copied to the TPBF of the TPBE by using the TPBE, and each seven indication bits in the original TIM is indicated by using one TPBE.

If the last sub-element after compression is the TPBE, but a remaining segment of the original TIM is less than seven indication bits, "0" may be filled in a spare bit in the TPBE; if values of the last several indication bits of the original TIM is "1"s, and the SIBE or IBOE sub-element is used to skip those consecutive 1-value indication bits, one 0-value indication bit may be added at the end of the original TIM for compression.

It should be noted that, it is mainly assumed above that the TPBE uses one bit to indicate the sub-element type, while the SIBE and the IBOE each use two bits to indicate their sub-element types. If only 0-value indication bits are compressed, and 1-value indication bits in the original TIM are very sparse, in consideration of the compression efficiency, the SIBE may also use one bit to indicate its sub-element type, while the TPBE and the IBOE each use two bits to indicate their sub-element types. In this way, because 1-value indication bits in the original TIM are very sparse, so that a tiny partial bitmap in the TPBE does not need to be very long; and one more bit in the field may be used to indicate the number of bits skipped in the SIBE, the value range that can be indicated becomes larger, more consecutive 0-value indication bits can be skipped, so that the possibility that the IBOE is used becomes smaller, thereby achieving a better compression effect.

303: The wireless access device broadcasts the compressed TIM.

In an actual application, the compressed TIM may be carried in a beacon frame for sending, or be carried in another broadcast frame for sending. It may be understood that, the wireless access device may also first segment the whole original TIM for compression, and then send compressed TIMs of segments, which is not limited in the present invention; if segmentation compression is used, when sending a compressed TIM of a segment, the wireless access device may include information related to the segmentation in a broadcast frame that carries the compressed TIM of the segment, for example, include information of the number of segments and the length of the segment, or the IBOE is used in the first sub-element in the compressed TIM, so as to indicate a start value of an indication bit serial number, and an indication bit serial number offset used in the sub-element is a serial number relative to the TIM of the segment.

304: The mobile device receives the compressed TIM.

The compressed TIM received by the mobile device may include at least one sub-element, and the at least one sub-element may include at least one of the SIBE, IBOE, and TPBE (where a decompression order of the sub-elements included in the compressed TIM may be agreed on between a compression end and a decompression end or notified by one end to the other end, and the decompression order may be, for example, a left-to-right order or a right-to-left order). The TPBE includes a TPBF and a TPBE type indication field, and the TPBF is used for indicating a segment with a set length from a compress start position corresponding to the TPBE in the original TIM corresponding to the compressed TIM; the SIBE includes an SIBF and an SIBE type indication field, and the SIBF is used for indicating the number of skipped consecutive indication bits with the same value from a compress start position corresponding to the SIBE in the original TIM;

and the IBOE includes an IBOF and an IBOE type indication field, and the IBOF is used for indicating an indication bit serial number corresponding to an indication bit behind skipped consecutive indication bits with the same value from a compress start position corresponding to the IBOE in the original TIM.

305: The mobile device determines, by decompressing the compressed TIM, a value of an indication bit corresponding to an indication bit serial number of the mobile device in the original TIM.

306: If the mobile device determines that the value of the indication bit corresponding to the indication bit serial number of the mobile device in the original TIM indicates that the mobile device has downlink data, the mobile device receives the downlink data.

The following describes a specific compression algorithm and decompression algorithm process, and description is mainly made through an example where the compressed TIM may include a TPBE with the structure shown in FIG. 4C, an SIBE with the structure shown in FIG. 4E, and an IBOE with the structure shown in FIG. 4I.

In the following, "=" indicates that a value is given, and "==" indicates that whether two sides are equal is determined.

It is assumed that the compression method where the BV field is not included is used.

Figure 5:
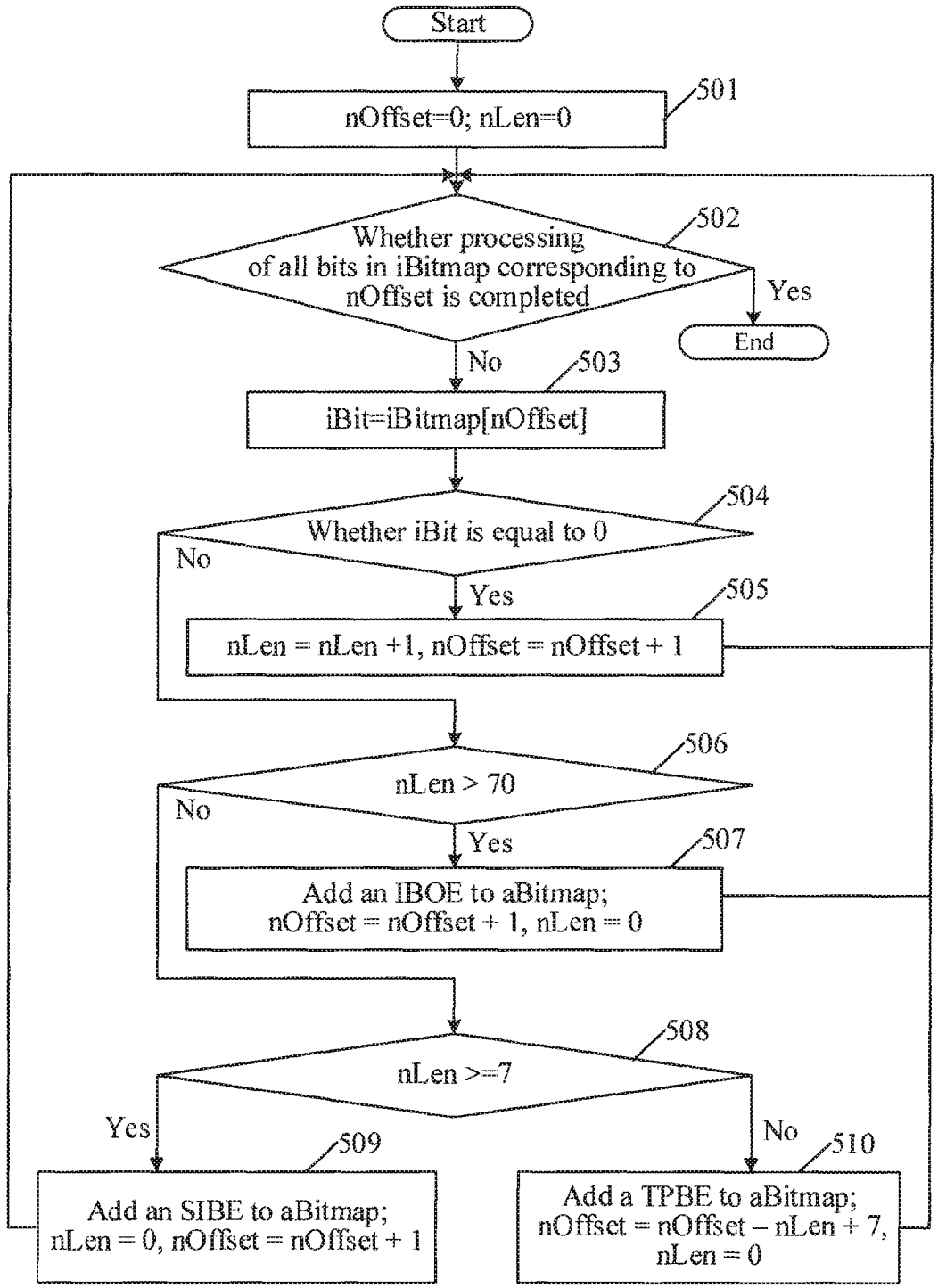
FIG. 5 is a schematic flowchart of TIM compression according to an embodiment of the present invention.

Referring to FIG. 5, a TIM compression method may include the following steps.

501: It is assumed that iBitmap is an original TIM, whose unit is a bit; nOffset indicates a serial number, that is an offset, of a processed indication bit in iBitmap, that is, the (nOffset)$^{th}$ bit of iBitmap, where nOffset starts from 0; iBitmap[nOffset] indicates the (nOffset)$^{th}$ bit in iBitmap, where the initial value of nOffset is 0 (nOffset=0); it is assumed that the number of encountered bits whose values are 0s in iBitmap is nLen, where the initial value of nLen is 0 (nLen=0); and it is assumed that aBitmap is a compressed TIM, whose unit is a byte, and the initial value is empty.

502: Determine whether processing of all bits in iBitmap corresponding to nOffset is completed; if yes, end the process; and if not, perform step 503.

503: iBit=iBitmap[nOffset].

504: Determine whether iBit is equal to 0; if yes, perform step 505; and if not, perform step 506.

505: nLen=nLen+1, nOffset=nOffset+1, and turn to step 502.

506: Determine whether nLen>70; if yes, perform step 507; and if not, perform step 508; herein, a value of the SIBF in the SIBE is defined as the number, subtracted by 7, of actually skipped 0-value bits, that is, the value of the SIBF being "0" indicates that seven "0"s are actually skipped, the value of the SIBF being "1" indicates that eight "0"s are actually skipped, and so on, and the value of the SIBF being "63" indicates that 70 "0"s are actually skipped, which obtains a better compression effect in a case in which "1"s in the original TIM are sparse.

507: Add the IBOE to aBitmap, where specifically, two bytes are added herein; where both bit 0 and bit 1 of the added two bytes are set to "1", that is, its sub-element type indication field is set to "11" (which indicate values of two bits rather than a character string, and the same goes in the following), and other 14 bits are set to the value of nOffset; and nOffset=nOffset+1, nLen=0, and turn to step 502.

508: Determine whether nLen>=7 (that is, 70>=nLen>=7); if yes, perform step 509; and if not, perform step 510.

509: Add the SIBE to aBitmap, where specifically, one byte is added herein; where, in the added byte, bit 0 is set to "1", and bit 1 is set to "0", that is, the sub-element type indication field is set to "10", and other six bits are used as an integer, and set to nLen−7; nLen=0, nOffset=nOffset+1, and turn to step 502.

510: Add the TPBE to aBitmap, and specifically, one byte is added herein; where, bit 0 of the added byte is set to "0", that is, the sub-element type indication field is set to "0", and other seven bits are seven bits starting from iBitmap[nOffset−nLEN]; nOffset=nOffset−nLen+7, nLen=0, and turn to step 502.

It may be understood that, the process where compression is performed by using the SIBF and IBOE including the BV field is similar to the foregoing exemplified process, which is not described herein again.

After receiving the compressed TIM, the mobile device sequentially scans the sub-elements of the compressed TIM, so as to determine that a value of a bit corresponding to its AID is "1" or "0". For example, being "1" indicates that the mobile device needs to receive downlink data from the wireless access device; otherwise, it indicates that no downlink data needs to be received.

The mobile device may determine the value of the bit corresponding to the mobile device according to the following process, where it is assumed that compression is performed by using the SIBE and IBOE including the BV field.

bits[1] indicates the first element in an array, bits[0 . . . 7] indicates the first to eighth elements of the array of the bits, and so on.

Figure 6:
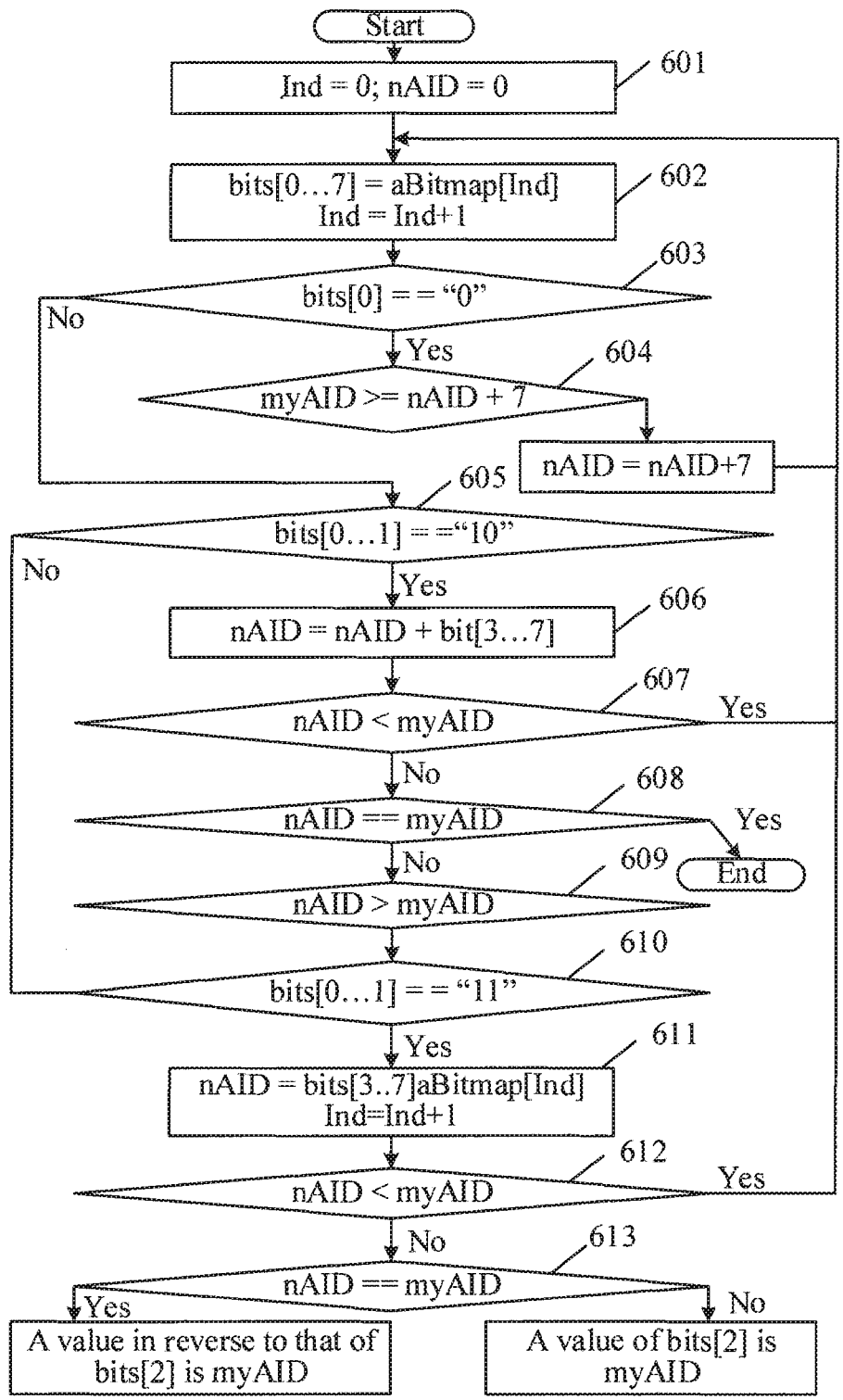
FIG. 6 is a schematic flowchart of TIM decompression according to an embodiment of the present invention.

Referring to FIG. 6, a TIM decompression method may include the following steps.

601: It is assumed that aBitmap is a received compressed TIM, whose unit is byte, and the length of a sub-element is one byte or two bytes; variable Ind indicates a byte index of aBitmap, and it is assumed that Ind=0 (that is, the initial value of Ind is 0); the AID corresponding to the mobile device is myAID, and it is assumed that variable nAID=0 (that is, it is assumed that the initial value of nAID is 0); and array bits[0 . . . 7] indicates eight bits in one byte; and for ease of description, the compressed TIM herein is a result obtained by compression by taking indication bits corresponding to all mobile devices managed by the wireless access device as a single group, that is, the grouping technology is not used, and therefore, an obtained indication bit offset is the AID of the mobile device. It may be understood that, if the compressed TIM is a result obtained by compressing one indication bit group, in the following process, nAID plus an AID value corresponding to the first indication bit of a group corresponding to the compressed TIM is the AID value of the mobile device represented by the indication bit.

602: bits[0 . . . 7]=aBitmap[Ind]; that is, the (Ind)$^{th}$ byte in aBitmap is copied to the array of the bits, and if the sub-elements are not stored according to the bytes, several bits are sequentially copied from aBitmap; and Ind=Ind+1.

603: Determine bits[0]=="0"; if yes, it indicates that it is a TPBE, and perform step 604; and if not, perform step 605.

604: Determine whether myAID>=nAID+7; if yes, it indicates that the bit corresponding to myAID is not in the TPBE, nAID=nAID+7, and turn to step 602; and if not, bits[myAID−nAID] is the value of the bit corresponding to myAID, and end the process.

605: Determine bits[0 . . . 1]=="10"; if yes, it indicates that it is an SIBE, and perform step 606; and if not, turn to step 610.

606: nAID=nAID+bit[3 . . . 7], that is, the indicated number of skipped indication bits+1 (where the indication bit behind the SIBE is not included in any sub-element).

607: Determine whether nAID<myAID; if yes, it indicates that the bit of myAID is not encountered yet, nAID=nAID+1, and turn to step 602; otherwise, perform step 608.

608: Determine nAID==myAID; if yes, it indicates that myAID is the indication bit behind the indication bits skipped by the sub-element, and the value inverse to that of bits[2] is the value of the indication bit corresponding to myAID, that is, if bits[2] is "1", the indication bit of myAID is "0"; if bits[2] is "0", the indication bit of myAID is "1", and end the process; and otherwise, perform step 609.

609: Determine whether nAID>myAID (where after the determination above is performed, the determination herein is definitely positive, and therefore, the determination may be not performed and the following processing is directly performed); if yes, it indicates that myAID is an indication bit skipped by the sub-element, and the value of bits[2] is the value of the indication bit corresponding to myAID, and end the process.

610: Determine bits[0 . . . 1]=="11"; if yes, it indicates that it is an IBOE, and perform step 611; and if not, it indicates that an error occurs in the decompression process, and end the process (where actually, this case does not exist, through the determination above, the determination herein is definitely positive, and therefore, the determination may be not performed and the following processing is directly performed).

611: nAID=bits[3 . . . 7] and the value indicated by eight bits of aBitmap[Ind], Ind=Ind+1.

612: Determine whether nAID<myAID; if yes, it indicates that the indication bit of myAID is not encountered yet, nAID=nAID+1, and perform step 602; and if not, perform step 613.

613: Determine nAID==myAID; if yes, it indicates that myAID is the indication bit indicated by the sub-element, and a value inverse to that of bits[2] is the value of the indication bit corresponding to myAID, and end the process; and if not, that is, nAID>myAID, it indicates that myAID is an indication bit skipped by the sub-element, and the value of bits[2] is the value of the indication bit corresponding to myAID, and end the process.

It may be understood that, for a manner where compression is performed by using the SIBF and IBOE not including the BV field, the process where the mobile device obtains, by decompression, the value of the indication bit corresponding to its indication bit serial number is similar to the above, which is not detailed herein.

It should be noted that, in the foregoing method examples, the AID is actually an identifier of a data receiving end, the position, that is, the serial number, of each indication bit in the original TIM in the complete original TIM is the AID, the receiving end refers to an STA connected to an AP in the IEEE 802.11 standard; however, it may be understood that, each bit in the original TIM may correspond to a receiving end of any conception, for example, a different application on one mobile device, and the serial number of each bit in the original TIM may be an identifier allocated by an access device to a different mobile device or a different application. Herein, the AP may also be replaced with a base station of a cellular network, and the STA may also be an application terminal on the cellular network, and the like. The serial number of each bit in the original TIM in the complete original TIM is generally defined according to a transmission order, that is, in each byte, the serial number of bit 0 is smaller, while the serial number of bit 7 is greater; however, because information is always transmitted in unit of a byte, it may also be defined that the serial number of bit 7 is smaller while the serial number of bit 0 is greater and the like; the present invention does not focus on the definition of the serial number of the bit, and is merely described according to the agreement in the existing stipulation of IEEE 802.11, that is, the serial number of bit 0 being smaller while the serial number of bit 7 being greater. According to a definition, when an array indicates an integer, the weight of a bit with a low serial number is low, and the weight of a bit with a high serial number is high. Therefore, in the embodiment of the present invention, a most significant bit being right and a least significant bit being left are formed when the described related numerical values such as the number of skipped bits are indicated, which should be understood by a person skilled in the art.

In another embodiment of the present invention, the original TIM mentioned in the foregoing embodiment may also be an actual group of a TIM of a larger range (where, in this case, the original TIM may also be called an original indication bit group, and the compressed original indication bit group is called a compressed group); the TIM of the larger range mentioned herein is called a primary original TIM in the following, and the primary original TIM may be the entirety of or a part of a TIM in the wireless access device that includes indication information of all mobile devices served by the wireless access device, and this grouping relationship may be in the form of multi-stage concatenation.

To obtain a better compression effect, the primary original TIM may be divided into multiple original TIMs with a fixed length, so that a short sub-element is used to compress the original TIMs. The length of the original TIM may be set according to an indicated value range of a byte in a sub-element, so that the value range of the byte in the sub-element is effectively used. For example, only the TPBE and the SIBE are used to compress the original TIM, the length of the TPBE is set to four bits, and the length of the SIBE is set to eight bits. In this case, each sub-element type indication field in the sub-elements requires only one bit, and accordingly the skipped indication bits field of the skipped indication bits sub-element has seven bits, and a value range of an unsigned integer that can be indicated is 0 to 127, which can indicate that 3 to 130 consecutive indication bits with the same value are skipped. In this case, the length of the original TIM, that is, the group, may be set to 128, that is, the maximum unsigned integer that the SIBF can indicate in the SIBE plus one.

For another example, the TPBE, the SIBE, and the IBOE may be used to compress the original TIM, the lengths of the TPBE and the SIBE each are set to four bits, and the IBOE is set to eight bits. In this case, the sub-element type indication field in the TPBE occupies two bits, and the other two bits indicate a tiny partial bitmap; the type field of the SIBE occupies one bit, the other three bits may indicate that 2 to 9 consecutive indication bits with the same value are skipped; the type field of the IBOE occupies two bits, and the other six bits indicate an offset, of an indication bit in the group, in this group, and the indicated value range of an unsigned integer is 0 to 63. In this case, the length of the original TIM, that is, the group, may be set to 64, that is, the maximum unsigned integer that the IBOF can indicate in the SIBE plus one. The offset of the indication bit herein is the position of an indication bit relative to the first indication bit of the group, the offset value of the first indication bit in the group is always 0, and the offset of the last indication bit in the group is the length of the group subtracted by 1. Certainly, the length of the sub-element may be 4, 5, 6, 8, 10, or the like, and the length of the IBOE is generally greater than the lengths of the TPBE and the SIBE, but is not necessarily two times greater. Compression may be performed by using only the TPBE and the SIBE, or using only the TPBE and the IBOE, or using the three sub-elements. In a case in which two sub-elements are used, the sub-element type indication field in each sub-element requires only one bit, while in a case in which three sub-elements are used, the sub-element type indication field of one sub-element requires one bit, but the sub-element type indication fields of the other two sub-elements each use at least two bits.

To distinguish in the final compressed TIM (where the final compressed TIM may have serial compressed TIMs corresponding to multiple original TIMs, which may be called a compressed TIM set), compressed TIMs corresponding to the groups, that is, the original TIMs, one GSE is included before the compressed TIM corresponding to each group. The "before" stated herein refers to "before" the decompression order of the receiving end of the compressed TIM, which should be understood by a person skilled in the art, and is not described again.

Certainly, a value and a format of the GSE need to be different from those of other sub-elements so that the receiving end can identify the GSE. For example, the length of the GSE is the same as the length of the TPBE, in the GSE, a value of a bit at the same position as the sub-element type indication field of the TPBE may be the same as a value of the sub-element type indication field of the TPBE, and in the GSE, the value of the bit at the same position as the TPBF of the TPBE may be a value that is impossible to be the value of the TPBF of the TPBE.

Assumed that the original IM may include M3 indication bits; M3 may be equal to the maximum value that the IBOF can indicate in the IBOE plus one, for example, assuming that the IBOF occupies eight bits, and the maximum value that the IBOF can indicate is, for example, 255, M3 may be equal to 256.

The GSE indicates the start of a compressed TIM of an original group, which may only include one GSE type indication field. The length of the GSE may be the same as the length of the TPBE, a value of a bit in the GSE at the same position as the sub-element type indication field of the TPBE is the same as the value of the sub-element type indication field of the TPBE, and a value of another bit of the GSE is a value that is impossible to be a value of the TPBF of the TPBE. For example, the TPBE is four bits, and its TPBE type indication field is one bit with the value "0", and accordingly, the TPBF in the TPBE occupies three bits, but the value of the TPBF is impossible to be "000", because in this case, other sub-elements will be used for compression. Therefore, the value of the GSE may be "0000"; in the same setting, if 1-value bits in the original TIM are compressed, the value of the GSE may be "0111". For another example, if the length of the TPBE is six bits, its TPBE type indication field occupies two bits whose values are "10", and other sub-elements include a BV field, that is, the BV field is used to indicate that a value of a compressed indication bit is "0" or "1", the TPBF in the TPBE occupies four bits, but its value is impossible to be "0000" or "1111", because in this case, other sub-elements will be used for compression. Therefore, the value of the GSE may be "10000" or "101111", and such a value that can be distinguished from values of other sub-elements may be used as the value of the GSE.

The length of the GSE may also be shorter than that of the TPBE. For example, if the TPBE and the SIBE are used to compress the original TIM, the sub-element type indication field of the TPBE may occupy two bits whose values may be "00", and the sub-element type indication field of the SIBE may occupy one bit with the value "1", the length of the GSE may be two bits whose values are "01". For another example, if the TPBE, the SIBE, and the IBOE are used to compress the original TIM, the sub-element type indication field of each sub-element occupies two bits, for example, if a value of the sub-element type of the TPBE is, for example, "00", a value of the sub-element type indication field of the SIBE is, for example, "01", and a value of the sub-element type indication field of the IBOE is "10", the value of the sub-element type of the GSE is "11". In this method for defining the GSE, a value that is impossible to be a value of the TPBF in the TPBE is not reused, but a value of one or more other sub-elements type is actually used, so that the sub-element type fields of other sub-elements are longer, which may decrease the compression effect of grouped original TIMs, but the group start sub-element becomes shorter, which may better the overall compression effect. Therefore, how the group start sub-element is specifically defined may be determined according to an actual condition.

The advantage resulted from using the foregoing grouping method is: a shorter sub-element may be used to compress a shorter original TIM, which may obtain a better compression effect. If a group has more bits after being compressed, it may indicate that the whole group is not compressed, and the grouped original TIM is directly copied behind the GSE. In the compression solution where the SIBE and/or the IBOE uses the BV to indicate values of skipped indication bits, the value of the TPBF in the TPBE is not a combination of two types of values, which is all "0"s or all "1"s, and accordingly these two cases of the value of the TPBE may be defined as a value of the GSE, and the GSE with the value subsequently includes other sub-elements of the group; and the other case is defined as another value of the GSE, the GSE with the value subsequently includes an original TIM not compressed of the group, and its length is the length of the group. In the compression solution where the BV field is not used to indicate the values of the skipped indication bits, that is, only 0-value or 1-value indication bits are compressed by default, and accordingly, only one case exists for a value that is impossible to be a value of the TPBF of the TPBE, this case may be defined as a value of the GSE, and the GSE with the value subsequently includes other sub-elements of the group (that is, indicates the start of the compressed TIM); in addition, a value in the SIBE is defined as another value of the GSE, and the GSE with the value subsequently includes an original TIM not compressed of the group. For example, if the SIBF in the SIBE is three bits, and the value range that the SIBF can indicate is 0 to 7, the value 0 may be used as a value of the GSE. Specifically, if the sub-element type indication field of the SIBE occupies one bit with the value "1", and "1000" is uses as a value of the GSE, "1001" to "1111" respectively indicate that the number of skipped consecutive indication bits with the same value is two to eight (where assuming that the TPBF of the TPBE occupies two bits, the SIBE may indicate that two to nine consecutive indication bits with the same value are skipped).

For the receiving end such as an STA, after the compressed TIM is received, the decompression process of the compressed TIM is to first determine whether the first sub-element in the compressed TIM is a GSE or not; if yes, the subsequent sub-elements before a next GSE are sub-elements of the group. For the first indication bit in each group, its serial number in the primary original TIM is a product obtained by multiplying a group number (starting from 0) of the group by the group length, a serial number of another indication bit in the group obtained by decompression is an offset plus this product, that is, a serial number of the indication bit in the primary original TIM is the offset. If the primary original TIM includes original TIMs of indication bits corresponding to all STAs served by the AP, an obtained serial number in the primary original TIM is an AID of an STA; otherwise, the serial number in the primary original TIM plus an AID corresponding to a start indication bit in the primary original TIM is the AID corresponding to the STA. The group number is a serial number of the GSE in a received compressed TIM. For example, the first GSE corresponds to the first group, the group number being 0; the second GSE corresponds to the second group, the group number being 1; and so on. The group length may be agreed on between the access point and the STA, which does not need to be indicated in the compressed TIM, but may also be indicated by another part of a message that bears the compressed TIM, which may be understood by a person skilled in the art, and is not detailed herein.

It may be understood that, when compressing an original IM, the wireless access device may further use other sub-elements, which is not limited in the present invention. In this embodiment, description is mainly made by taking an application scenario of TIM compression as an example, and solutions for compressing other IMs may be deducted by analogy according to that. In this embodiment, the wireless access device may be an access point, a base station, or other network entities having a wireless access function.

As can be seen, in this embodiment, the compressed IM generated by the wireless access device includes at least one of the TPBE, the SIBE, and the IBOE, where the TPBE includes a TPBF and a TPBE type indication field, and the TPBF is used for indicating a segment with a set length from a compress start position corresponding to the TPBE in the original IM corresponding to the compressed IM; the SIBE includes an SIBF and an SIBE type indication field, and the SIBF is used for indicating the number of skipped consecutive indication bits with the same value from a compress start position corresponding to the SIBE in the original IM; and the IBOE includes an IBOF and an IBOE type indication field, and the IBOF is used for indicating an indication bit serial number corresponding to an indication bit behind skipped consecutive indication bits with the same value from a compress start position corresponding to the IBOE in the original IM. In this way, consecutive indication bits with the same value corresponding to positions in the original IM can be compressed into the SIBE, the IBOE, or the like, and the mobile device that receives the compressed IM can determine the value of the indication bit corresponding to the indication bit serial number corresponding to the mobile device in the original IM, and further execute the corresponding indicated operation according to the value. The IM compression mechanism provided in the embodiment of the present invention facilitates improvement of compression efficiency of an IM, and further reduces radio air interface resources occupied for sending the IM and improves IM sending efficiency.

It should be noted that, for brevity, the foregoing method embodiments are represented as a series of actions. However, a person skilled in the art should appreciate that the present invention is not limited to the order of the described actions, because according to the present invention, some steps may adopt other order or occur simultaneously. It should be further understood by a person skilled in the art that the described embodiments all belong to exemplary embodiments, and the involved actions and modules are not necessarily required by the present invention.

To better implement the solutions of the embodiments of the present invention, the following further provides related apparatuses for implementing the solutions.

Figure 7:
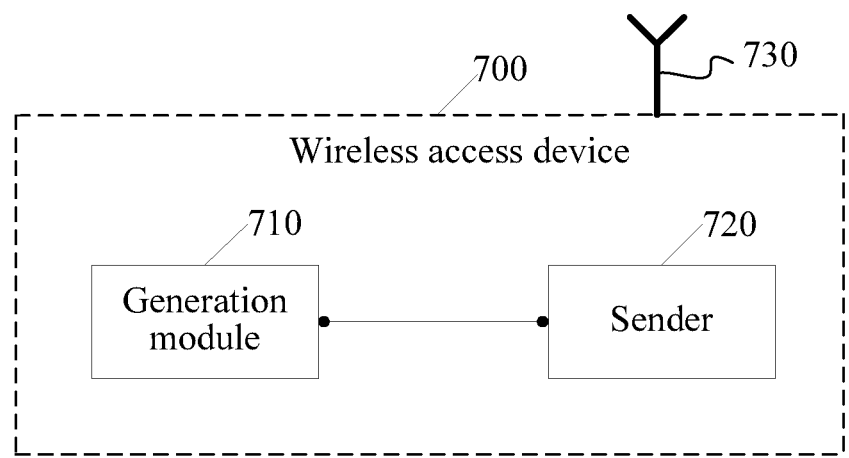
FIG. 7 is a schematic diagram of a wireless access device according to an embodiment of the present invention.

Referring to FIG. 7, an embodiment of the present invention provides a wireless access device 700, which may include a generation module 710 and a sender 720.

The generation module 710 is configured to generate a compressed IM.

The compressed IM generated by the generation module 710 may include at least one sub-element, and the at least one sub-element may include an SIBE, an IBOE, and a TPBE and the like (where a decompression order of the sub-elements included in the compressed IM may be agreed on between a compression end and a decompression end or notified by one end to the other end, and the decompression order may be, for example, a left-to-right order or a right-to-left order). The TPBE includes a TPBF and a TPBE type indication field, and the TPBF is used for indicating a segment with a set length from a compress start position corresponding to the TPBE in an original IM corresponding to the compressed IM; the SIBE includes an SIBF and an SIBE type indication field, and the SIBF is used for indicating the number of skipped consecutive indication bits with the same value from a compress start position corresponding to the SIBE in the original IM; and the IBOE includes an IBOF and an IBOE type indication field, and the IBOF is used for indicating an indication bit serial number corresponding to an indication bit behind skipped consecutive indication bits with the same value from a compress start position corresponding to the IBOE in the original IM.

The sender 720 is configured to send the compressed IM generated by the generation module 710.

Diversified manners may be available for the generation module 710 to generate the compressed IM that includes at least one sub-element.

In a feasible implementation manner, the generation module 710 may be specifically configured to: if there are M1 consecutive indication bits whose values are not completely the same from a start position of a remaining-to-be compressed segment of the original IM, compress the M1 indication bits into one TPBE, where a TPBF of the TPBE is used for indicating the M1 indication bits; if there are consecutive indication bits with the same value whose number is neither less than M1 nor greater than M2 from the start position of the remaining-to-be compressed segment of the original IM, compress the indication bits whose number is neither less than M1 nor greater than M2 into one SIBE, where an SIBF of the SIBE is used for indicating the number of the indication bits and the number is neither less than M1 nor greater than M2; and the SIBE further includes a skipped indication bit value field, where the skipped indication bit value field is used for indicating values of the indication bits whose number is neither less than M1 nor greater than M2, and M1 is less than or equal to M2; and if there are consecutive indication bits with the same value whose number is greater than M2 from the start position of the remaining-to-be compressed segment of the original IM, compress the indication bits whose number is greater than M2 into one IBOE, where an IBOF of the IBOE is used for indicating an indication bit serial number corresponding to an indication bit behind the indication bits whose number is greater than M2; and the IBOE further includes a skipped indication bit value field (which may be called a BV field for short), where the skipped indication bit value field is used for indicating values of the indication bits whose number is greater than M2.

M1 may be equal to, for example, the number of indication bits of the TPBF in the TPBE (that is, the maximum length of the segment of the original IM that can be indicated). M2 may be equal to, for example, a maximum value of the SIBF field (that is, values of all bits are "1"), or some or all values of the SIBF field less than M1 may also be defined to values greater than the maximum value of the SIBF field, or it is defined that the value of the SIBF field plus M1 is the number of actually indicated skipped indication bits. Specifically, how the maximum value indicated by the SIBF in the SIBE is defined is determined according to an actual condition. For example, when the length of the TPBF is three bits, and the length of the SIBF is five bits, M1 is equal to 3, and M2 may be equal to 31 (the maximum value of the SIBF) or 34 (where because M1 is 3, the SIBF skips at least three indication bits, and accordingly a range of a value that the SIBF can indicate may be defined to 3 to 34); or, when the length of the TPBF is seven bits, and the length of the SIBF is six bits, M1 is equal to 7, and M2 may be equal to 63 (the maximum value of the SIBF) or 70 (where, in this case, because the SIBF skips at least seven indication bits, a range of a value that the SIBF can indicate may be defined to 7 to 70) or a value between 63 and 70. Certainly, M1 may also have other values, and M2 may also be other positive integers greater than M1. In addition, values of M1 and M2 and lengths of the TPBF and SIBF fields may also be specifically set according to the length and density of the original IM to be compressed, so as to achieve an optimal compression effect.

In another feasible implementation manner, the generation module 710 may be specifically configured to: if, from a start position of a segment, of the original IM, remaining to be compressed, there are N1 consecutive indication bits that include a first-value indication bit (where assuming that each indication bit occupies one bit, the first-value indication bit may be a 0-value indication bit while a second-value indication bit is a 1-value indication bit, or the first-value indication bit may be a 1-value indication bit while the second-value indication bit is a 0-value indication bit, and a case where an indication bit occupies multiple bits is deducted by analogy; the first value and the second value are different values for an indication bit, where an example where the original IM is an original TIM is taken, a value of each indication bit in the original TIM being the first value (for example, the value being "1") may indicate that a receiving end corresponding to the indication bit has downlink data that needs to be received, while being the second value (for example, being "0") indicates that a receiving end corresponding to the indication bit has no downlink data to be received or no corresponding receiving end exists) exist, compress the N1 consecutive indication bits into one TPBE, where a TPBF of the TPBE is used for indicating the N1 consecutive indication bits; if there are consecutive second-value indication bits whose number is neither less than N1 nor greater than N2 from the start position of the remaining-to-be compressed segment of the original IM, compress the second-value indication bits whose number is neither less than N1 nor greater than N2 into one SIBE, where an SIBF of the SIBE is used for indicating the number of the second-value indication bits whose number is neither less than N1 nor greater than N2; and if there are consecutive second-value indication bits whose number is greater than N2 from the start position of the remaining-to-be compressed segment of the original IM, compress the second-value indication bits whose number is greater than N2 into one IBOE, where an IBOF of the IBOE is used for indicating an indication bit serial number corresponding to an indication bit behind the second-value indication bits whose number is greater than N2; and N1 is less than or equal to N2.

N1 is equal to, for example, the number of indication bits of the TPBF in the TPBE. N2 is equal to a maximum value that the SIBF can indicate in the SIBE; N2 is equal to, for example, a maximum value of the SIBF (that is, values of all bits are "1"), or some or all values of the SIBF field less than N1 may also be defined to values greater than the maximum value of the SIBF field, or it is defined that the value of the SIBF field plus N1 is the number of actually indicated skipped indication bits. Specifically, how the maximum value indicated by the SIBF in the SIBE is defined is determined according to an actual condition. For example, when the length of the TPBF is three bits, and the length of the SIBF is five bits, N1 is equal to 3, and N2 may be equal to 31 (the maximum value of the SIBF) or 34 (where because if N1 is 3, the SIBF skips at least three indication bits, a range of a value that the SIBF can indicate may be defined to 3 to 34); or, when the length of the TPBF is seven bits, and the length of the SIBF is six bits, N1 is equal to 7, and N2 may be equal to 63 (the maximum value of the SIBF) or 70 (where, in this case, because the SIBF skips at least seven indication bits, a range of a value that the SIBF can indicate may be defined to 7 to 70) or a value between 63 and 70.

The lengths of the sub-elements in the compressed IM may be set according to a specific requirement, so as to meet different compression requirements. For example, each TPBE may occupy one byte, each SIBF may occupy one byte, and each IBOF may occupy two bytes. Certainly, each TPBE, each SIBF, and each IBOF may also occupy more or less bytes, respectively.

In an embodiment of the present invention, for an indication bit behind skipped consecutive indication bits with the same value corresponding to each SIBF in the original IM, if a value of the indication bit can be deducted (for example, it may be deducted that the value of the indication bit is inverse to that of the consecutive indication bits with the same value), the indication bit may be or not be compressed to one or more other sub-elements of the compressed IM (where not compressing the indication bit can improve the IM compression efficiency); if the value of the indication bit cannot be deducted, the indication bit is compressed to one or more other sub-elements of the compressed IM (for example, compressed to a subsequent TPBE). Similarly, for an indication bit corresponding to an indication bit serial number indicated by each IBOF in the original IM, if a value of the indication bit can be deducted (for example, it may be deducted that the value of the indication bit is inverse to that of the consecutive indication bits with the same value), the indication bit may be or not be compressed to one or more other sub-elements of the compressed IM; if the value of the indication bit cannot be deducted, the indication bit is compressed to one or more other sub-elements of the compressed IM (for example, compressed to a subsequent TPBE).

In a feasible implementation manner, if the compressed IM includes the TPBE and the SIBE, the TPBE type indication field of the TPBE may occupy one bit, and the SIBE type indication field in the SIBE may occupy one bit. Or, if the compressed IM includes the TPBE and the IBOE, the TPBE type indication field in the TPBE may occupy one bit, and the IBOE type indication field in the IBOE may occupy one bit. Or, if the compressed IM includes the SIBE and the IBOE, the SIBE type indication field in the SIBE may occupy one bit, and the IBOE type indication field in the IBOE may occupy one bit. Or, if the compressed IM includes the TPBE, the SIBE, and the IBOE, the TPBE type indication field of the TPBE may occupy one bit, the SIBE type indication field in the SIBE may occupy two bits, and the IBOE type indication field in the IBOE may occupy two bits. Or, if the compressed IM includes the TPBE, the SIBE, and the IBOE, the TPBE type indication field of the TPBE may occupy two bits, the SIBE type indication field of the SIBE may occupy one bit, and the IBOE type indication field in the IBOE may occupy two bits. Or, if the compressed IM includes the TPBE, the SIBE, and the IBOE, the TPBE type indication field of the TPBE may occupy two bits, the SIBE type indication field of the SIBE may occupy two bits, and the IBOE type indication field in the IBOE may occupy one bit.

It may be understood that, in a case in which the original IM is compressed by using only two sub-elements, for example, using only the TPBE and the SIBE, or using only the TPBE and the IBOE, only one bit is required in the sub-element type indication field in each sub-element for distinguishing the two sub-elements.

If the original IM is one group of a primary original IM, that is, the primary original IM includes multiple original IMs, and if the wireless access device combines compressed IMs corresponding to at least two groups (namely, at least two original IMs) of each primary original IM as one compressed IM set for sending (where IMs in the compressed IM set may all be compressed IMs, or both a compressed IM and an original IM exist), in this case, each compressed IM in the compressed IM set may further include a GSE, where the GSE indicates the start of the compressed IM, for example, the GSE may be located at the start position of each compressed IM, so that a decompression end can know the start of the compressed IM. In addition, if the compressed IM set further includes an original IM (that is, an indication bit group, not compressed), a GSE may also be added at the start position of the original IM, so as to indicate the start of the original IM. Certainly, values of the GSE at the start position (or other determined positions) of the compressed IM and the GSE at the start position (or other determined positions) of the original IM are different for distinguished indications. The decompression end can know the start of each original IM or each compressed IM in the received compressed IM set accordingly, so as to perform corresponding decompression processing.

It may be understood that, in this embodiment, the wireless access device 700 may be the wireless access device in the foregoing method embodiments, functions of its functional modules may be specifically implemented according to the methods in the foregoing method embodiments, and for a specific implementation process, reference may be made to related description of the method embodiments, which is not described herein again.

It should be noted that, in this embodiment, the wireless access device 700 may include multiple types of hardware, so as to assist implementation of functions of related functional modules, for example, the wireless access device 700 may include an antenna 730 and the like.

Figure 8:
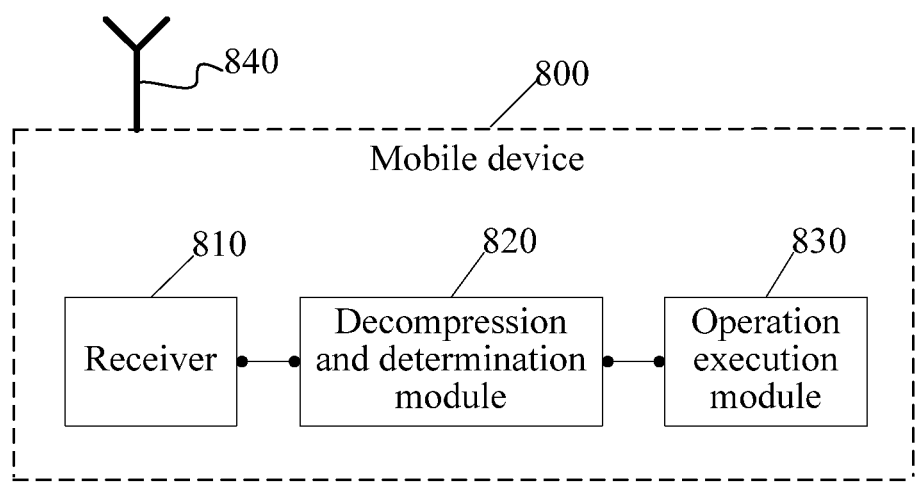
FIG. 8 is a schematic diagram of a mobile device according to an embodiment of the present invention.

Referring to FIG. 8, an embodiment of the present invention further provides a mobile device 800, which may include: a receiver 810, a decompression and determination module 820, and an operation execution module 830.

The receiver 810 is configured to receive a compressed IM.

The compressed IM received by the receiver 810 may include at least one sub-element, and the at least one sub-element may include an SIBE, an IBOE, and a TPBE and the like (where a decompression order of the sub-elements included in the compressed IM may be agreed on between a compression end and a decompression end or notified by one end to the other end, and the decompression order may be, for example, a left-to-right order or a right-to-left order). The TPBE includes a TPBF and a TPBE type indication field, and the TPBF is used for indicating a segment with a set length from a compress start position corresponding to the TPBE in an original IM corresponding to the compressed IM; the SIBE includes an SIBF and an SIBE type indication field, and the SIBF is used for indicating the number of skipped consecutive indication bits with the same value from a compress start position corresponding to the SIBE in the original IM; and the IBOE includes an IBOF and an IBOE type indication field, and the IBOF is used for indicating an indication bit serial number corresponding to an indication bit behind skipped consecutive indication bits with the same value from a compress start position corresponding to the IBOE in the original IM.

The decompression and determination module 820 is configured to determine, by decompressing the compressed IM received by the receiver 810, a value of an indication bit corresponding to an indication bit serial number corresponding to the mobile device 800 in the original IM.

The operation execution module 830 is configured to: if the decompression and determination module 820 determines that the value of the indication bit corresponding to the indication bit serial number corresponding to the mobile device 800 indicates that the mobile device 800 needs to execute an indicated operation, execute the indicated operation.

For example, assuming that the IM is a TIM, the decompression and determination module 820 is configured to determine, by decompressing a compressed TIM received by the receiver 810, a value of an indication bit corresponding to an indication bit serial number corresponding to the mobile device 800 in an original TIM; and the operation execution module 830 is configured to: if the decompression and determination module 820 determines that the value of the indication bit corresponding to the indication bit serial number corresponding to the mobile device 800 indicates that the mobile device 800 has downlink data, acquire the downlink data.

It may be understood that, in this embodiment, the mobile device 800 may be the mobile device in the foregoing method embodiments, functions of its functional modules may be specifically implemented according to the methods in the foregoing method embodiments, and for a specific implementation process, reference may be made to related description of the method embodiments, which is not described herein again.

It should be noted that, in this embodiment, the mobile device 800 may include multiple types of hardware, so as to assist implementation of functions of related functional modules, for example, the mobile device 800 may include an antenna 840 and the like.

An embodiment of the present invention further provides a communication system, including: the wireless access device 700 and/or the mobile device 800.

In the foregoing embodiments, the description of each of the embodiments has respective focuses. For a part that is not described in detail in a certain embodiment, reference may be made to related descriptions in other embodiments.

In conclusion, in the embodiment of the present invention, the compressed IM generated by the wireless access device includes at least one of the TPBE, the SIBE, and the IBOE, where the TPBE includes a TPBF and a TPBE type indication field, and the TPBF is used for indicating a segment with a set length from a compress start position corresponding to the TPBE in the original IM corresponding to the compressed IM; the SIBE includes an SIBF and an SIBE type indication field, and the SIBF is used for indicating the number of skipped consecutive indication bits with the same value from a compress start position corresponding to the SIBE in the original IM; and the IBOE includes an IBOF and an IBOE type indication field, and the IBOF is used for indicating an indication bit serial number corresponding to an indication bit behind skipped consecutive indication bits with the same value from a compress start position corresponding to the IBOE in the original IM. In this way, consecutive indication bits with the same value corresponding to positions in the original IM can be compressed into the SIBE, the IBOE, or the like, and the mobile device that receives the compressed IM can determine the value of the indication bit corresponding to the indication bit serial number corresponding to the mobile device in the original IM, and further execute the corresponding indicated operation according to the value. The IM compression mechanism provided in the embodiment of the present invention facilitates improvement of compression efficiency of an IM, and further reduces radio air interface resources occupied for sending the IM and improves IM sending efficiency.

A person of ordinary skill in the art may understand that all or a part of the steps of the methods in the foregoing embodiments may be implemented by a program instructing relevant hardware. The program may be stored in a computer readable storage medium. The storage medium may include a read only memory, a random access memory, a magnetic disk or an optical disk.

The indication map delivery method, the indication operation method, the device, and the system provided by the embodiments of the present invention are described in detail above. Although the principles and implementation manners of the present invention are described through specific examples in this specification, the descriptions of the embodiments are only intended to help understand the method and core ideas of the present invention. Meanwhile, a person of ordinary skill in the art may make modifications to the specific implementation manners and application scopes according to the ideas of the present invention. To conclude, the content of the specification should not be construed as a limitation to the present invention.

What is claimed is:

1. An indication map delivery method, comprising:
generating a compressed indication map, wherein the compressed indication map comprises at least one of a tiny partial bitmap sub-element, a skipped indication bits sub-element, and an indication bit offset sub-element,
wherein the tiny partial bitmap sub-element comprises a tiny partial bitmap field and a tiny partial bitmap sub-element type indication field, wherein the tiny partial bitmap field is used for indicating, in an original indication map corresponding to the compressed indication map, a segment that has a set length starting from a compress start position corresponding to the tiny partial bitmap sub-element,
wherein the skipped indication bits sub-element comprises a skipped indication bits field and a skipped indication bits sub-element type indication field, wherein the skipped indication bits field is used for indicating a number of skipped consecutive indication bits with a same value from a compress start position corresponding to the skipped indication bits sub-element in the original indication map, and
wherein the indication bit offset sub-element comprises an indication bit offset field and an indication bit offset sub-element type indication field, wherein the indication bit offset field is used for indicating, in the original indication map, an indication bit serial number that corresponds to an indication bit behind skipped consecutive indication bits with the same value and that starts from a compress start position corresponding to the indication bit offset sub-element; and
sending the compressed indication map, wherein generating the compressed indication map comprises:
compressing M1 indication bits into one tiny partial bitmap sub-element when there are M1 consecutive indication bits whose values are not completely the same from a start position of a remaining to-be-compressed segment in the original indication map, wherein the tiny partial bitmap field of the tiny partial bitmap sub-element is used for indicating the M1 indication bits;
compressing indication bits whose number is neither less than M1 nor greater than M2 into one skipped indication bits sub-element when there are consecutive indication bits with the same value whose number is neither less than M1 nor greater then M2 from the start position of the segment of the remaining-to-be compressed segment in the original indication map, wherein the skipped indication bits field of the skipped indication bits sub-element is used for indicating the number of the indication bits and the number is neither less than M1 nor greater than M2, wherein the skipped indication bits sub-element further comprises a skipped indication bit value field, and wherein the skipped indication bit value field is used for indicating values of the indication bits whose number is neither less than M1 nor greater than M2, and M1 is less than or equal to M2; and
compressing indication bits whose number is greater than M2 into one indication bit offset sub-element when there are consecutive indication bits with the same value whose number is greater than M2 from the start position of the remaining-to-be compressed segment of the original indication map, wherein the indication bit offset field of the indication bit offset sub-element is used for indicating an indication bit serial number corresponding to an indication bit behind the indication bits whose number is greater than M2, wherein the indication bit offset sub-element further comprises a skipped indication bit value field, and wherein the skipped indication bit value field is used for indicating values of the indication bits whose number is greater than M2.

2. The method according to claim 1, wherein M1 is equal to the number of indication bits of the tiny partial bitmap field in the tiny partial bitmap sub-element, and wherein M2 is equal to a maximum value indicated by the skipped indication bits field.

3. An indication map delivery method, comprising:
generating a compressed indication map, wherein the compressed indication map comprises at least one of a tiny partial bitmap sub-element, a skipped indication bits sub-element, and an indication bit offset sub-element,
wherein the tiny partial bitmap sub-element comprises a tiny partial bitmap field and a tiny partial bitmap sub-element type indication field, wherein the tiny partial bitmap field is used for indicating, in an original indication map corresponding to the compressed indication map, a segment that has a set length starting from a compress start position corresponding to the tiny partial bitmap sub-element,
wherein the skipped indication bits sub-element comprises a skipped indication bits field and a skipped inclination bits sub-element type indication field, wherein the skipped indication bits field is used for indicating a number of skipped consecutive indication bits with a same value from a compress start position corresponding to the skipped indication bits sub-element in the original indication map, and
wherein the indication bit offset sub-element comprises an indication bit offset field and an indication bit offset sub-element type indication field, wherein the indication bit offset field is used for indicating, in the original indication map, an indication bit serial number that corresponds to an indication bit behind skipped consecutive indication bits with the same value and that starts from a compress start position corresponding to the indication bit offset sub-element; and sending the compressed indication map, wherein generating the compressed indication map comprises:

compressing N1 consecutive indication bits into one tiny partial bitmap sub-element when there are N1 consecutive indication bits that comprise a first-value indication bit from a start position of a remaining-to-be compressed segment of the original indication map, wherein the tiny partial bitmap field of the tiny partial bitmap sub-element is used for indicating the N1 consecutive indication bits;

compressing second-value indication bits whose number is neither less than N1 nor greater than N2 into one skipped indication bits sub-element when there are consecutive second-value indication bits whose number is neither less than N1 nor greater than N2 from the start position of the remaining-to-be compressed segment of the original indication map, wherein the skipped indication bits field of the skipped indication bits sub-element is used for indicating the number of the second-value indication bits whose number is neither less than N1 nor greater than N2; and compressing second-value indication bits whose number is greater than N2 into one indication bit offset sub-element when there are consecutive second-value indication bits whose number is greater than N2 from the start position of the remaining-to-be compressed segment of the original indication map, wherein the indication bit offset field of the indication bit offset sub-element is used for indicating an indication bit serial number corresponding to an indication bit behind the second-value indication bits whose number is greater N2, and wherein N1 is less than or equal to N2.

4. The method according to claim 3, wherein N1 is equal to the number of indication bits of the tiny partial bitmap field in the tiny partial bitmap sub-element, and wherein N2 is equal to a maximum value indicated by the skipped indication bits field.

5. An indication map delivery method, comprising:

generating a compressed indication map, wherein the compressed indication map comprises at least one of a tiny partial bitmap sub-element, a skipped indication bits sub-element, and an indication bit offset sub-element, wherein the tiny partial bitmap sub-element comprises a tiny partial bitmap field and a tiny partial bitmap sub-element type indication field, wherein the tiny partial bitmap field is used for indicating, in an original indication map corresponding to the compressed indication map, a segment that has a set length starting from a compress start position corresponding to the tiny partial bitmap sub-element, wherein the skipped indication bits sub-element comprises a skipped indication bits field and a skipped indication bits sub-element type indication field, wherein the skipped indication bits field is used for indicating a number of skipped consecutive indication bits with a same value from a compress start position corresponding to the skipped indication bits sub-element in the original indication map, and wherein the indication bit offset sub-element comprises an indication bit offset field and an indication bit offset sub-element type indication field, wherein the indication bit offset field is used for indicating, in the original indication map, an indication bit serial number that corresponds to an indication bit behind skipped consecutive indication bits with the same value and that starts from a compress start position corresponding to the indication bit offset sub-element; and sending the compressed indication map, wherein the compressed indication map comprises the tiny partial bitmap sub-element, the skipped indication bits sub-element, and the indication bit offset sub-element, wherein the tiny partial bitmap sub-element type indication field in the tiny partial bitmap sub-element occupies one bit, the sub-element type indication field in the skipped indication bits sub-element occupies two bits, and wherein the indication bit offset sub-element type indication field in the indication bit offset sub-element occupies two bits.

6. An indication map delivery method, comprising:

generating a compressed indication map, wherein the compressed indication map comprises at least one of a tiny partial bitmap sub-element, a skipped indication bits sub-element, and an indication bit offset sub-element, wherein the tiny partial bitmap sub-element comprises a tiny partial bitmap field and a tiny partial bitmap sub-element type indication field, wherein the tiny partial bitmap field is used for indicating, in an original indication map corresponding to the compressed indication map, a segment that has a set length starting from a compress start position corresponding to the tiny partial bitmap sub-element, wherein the skipped indication bits sub-element comprises a skipped indication bits field and a skipped indication bits sub-element type indication field, wherein the skipped indication bits field is used for indicating a number of skipped consecutive indication bits with a same value from a compress start position corresponding to the skipped indication bits sub-element in the original indication map, and wherein the indication bit offset sub-element comprises an indication bit offset field and an indication bit offset sub-element type indication field, wherein the indication bit offset field is used for indicating, in the original indication map, an indication bit serial number that corresponds to an indication bit behind skipped consecutive indication bits with the same value and that starts from a compress start position corresponding to the indication bit offset sub-element; and sending the compressed indication map, wherein the compressed indication map comprises the tiny partial bitmap sub-element, the skipped indication bits sub-element, and the indication bit offset sub-element, wherein the tiny partial bitmap sub-element type indication field in the tiny partial bitmap sub-element occupies two bits, the skipped indication bits sub-element type indication field in the skipped indication bits sub-element occupies one bit, and wherein the indication bit offset sub-element type indication field in the indication bit offset sub-element occupies two bits.

7. An indication map delivery method, comprising:

generating a compressed indication map, wherein the compressed indication map comprises at least one of a tiny partial bitmap sub-element, a skipped indication bits sub-element, and an indication bit offset sub-element, wherein the tiny partial bitmap sub-element comprises a tiny partial bitmap field and a tiny partial bitmap sub-element type indication field, wherein the tiny partial bitmap field is used for indicating, in an original indication map corresponding to the compressed indication map, a segment that has a set length starting from a compress start position corresponding to the tiny partial bitmap sub-element, wherein the skipped indication bits sub-element comprises a skipped indication bits field and a skipped indication bits sub-element type indication field, wherein the skipped indication bits field is used for indicating a number of skipped consecutive indication bits with a same value from a compress start position corresponding to the skipped indication bits sub-element in the original indication map, and wherein the indication bit offset sub-element comprises an indication bit offset field and an indication bit offset sub-element type indication field, wherein the indication bit offset field is used for indicating, in the original indication map, an indication bit serial number that corresponds to an indication bit behind skipped consecutive indication bits with the same value and that starts from a compress start position corresponding to the indication bit offset sub-element; and sending the compressed indication map, wherein the compressed indication map comprises the tiny partial bitmap sub-element, the skipped indication bits sub-element, and the indication bit offset sub-element, wherein the tiny partial bitmap sub-element type indication field in the tiny partial bitmap sub-element occupies two bits, the skipped indication bits sub-element type indication field in the skipped indication bits sub-element occupies two bits, and wherein the indication bit offset sub-element type indication field in the indication bit offset sub-element occupies one bit.

8. An indication map delivery method, comprising:

generating a compressed indication map, wherein the compressed indication map comprises at least one of a tiny partial bitmap sub-element, a skipped indication bits sub-element, and an indication bit offset sub-element, wherein the tiny partial bitmap sub-element comprises a tiny partial bitmap field and a tiny partial bitmap sub-element type indication field, wherein the tiny partial bitmap field is used for indicating, in an original indication map corresponding to the compressed indication map, a segment that has a set length starting from a compress start position corresponding to the tiny partial bitmap sub-element, wherein the skipped indication bits sub-element comprises a skipped indication bits field and a skipped indication bits sub-element type indication field, wherein the skipped indication bits field is used for indicating a number of skipped consecutive indication bits with a same value from a compress start position corresponding to the skipped indication bits sub-element in the original indication map, and wherein the indication bit offset sub-element comprises an indication bit offset field and an indication bit offset sub-element type indication field, wherein the indication bit offset field is used for indicating, in the original indication map, an indication bit serial number that corresponds to an indication bit behind skipped consecutive indication bits with the same value and that starts from a compress start position corresponding to the indication bit offset sub-element; and sending the compressed indication map, wherein an indication bit behind consecutive indication bits with the same value that are skipped by each skipped indication bits sub-element in the original indication map is not compressed to one or more other sub-elements in the compressed indication map, and wherein an indication bit corresponding to an indication bit serial number indicated by each indication bit offset sub-element in the original indication map is not compressed to one or more other sub-elements in the compressed indication map.

9. An indication map delivery method, comprising:

generating a compressed indication map, wherein the compressed indication map comprises at least one of a tiny partial bitmap sub-element, a skipped indication bits sub-element, and an indication bit offset sub-element, wherein the tiny partial bitmap sub-element comprises a tiny partial bitmap field and a tiny partial bitmap sub-element type indication field, wherein the tiny partial bitmap field is used for indicating, in an original indication map corresponding to the compressed indication map, a segment that has a set length starting from a compress start position corresponding to the tiny partial bitmap sub-element, wherein the skipped indication bits sub-element comprises a skipped indication bits field and a skipped indication bits sub-element type indication field, wherein the skipped indication bits field is used for indicating a number of skipped consecutive indication bits with a same value from a compress start position corresponding to the skipped indication bits sub-element in the original indication map, and wherein the indication bit offset sub-element comprises an indication bit offset field and an indication bit offset sub-element type indication field, wherein the indication bit offset field is used for indicating, in the original indication map, an indication bit serial number that corresponds to an indication bit behind skipped consecutive indication bits with the same value and that starts from a compress start position corresponding to the indication bit offset sub-element; and sending the compressed indication map, wherein the original indication map is a group in a primary original indication map, wherein the primary original indication map comprises multiple original indication maps, wherein the compressed indication map further comprises a group start sub-element, and wherein the group start sub-element indicates the start position of the compressed indication, wherein the length of the group start sub-element is the same as the length of the tiny partial bitmap sub-element, wherein in the group start sub-element, a value of a bit at a same position as the tiny partial bitmap sub-element type indication field is the same as a value of the sub-element type indication field of the tiny partial bitmap sub-element, and wherein in the group start sub-element, the value of the bit at the same position as the tiny partial bitmap field of the tiny partial bitmap sub-element is a value that is impossible to be a value of the tiny partial bitmap field in the tiny partial bitmap sub-element.

10. A wireless access device, comprising:

a computer processor configured to:

generate a compressed indication map, wherein the compressed indication map comprises at least one of a tiny partial bitmap sub-element, a skipped indication bits sub-element, and an indication bit offset sub-element, wherein the tiny partial bitmap sub-element comprises a tiny partial bitmap field and a tiny partial bitmap sub-element type indication field, wherein the tiny partial bitmap field is used for indicating a segment with a set length from a compress start position corresponding to the tiny partial bitmap sub-element in an original indication map corresponding to the compressed indication map, wherein the skipped indication bits sub-element comprises a skipped indication bits field and a skipped indication bits sub-element type indication field, wherein the skipped indication bits field is used for indicating a number of skipped consecutive indication bits with the same value from a compress start position corresponding to the skipped indication bits sub-element in the original indication map, wherein the indication bit offset sub-element comprises an indication bit offset field and an indication bit offset sub-element type indication field, wherein the indication bit offset field is used for indicating an indication bit serial number corresponding to an indication bit behind skipped consecutive indication bits with the same value from a compress start position corresponding to the indication bit offset sub-element in the original indication map; and a transmitter coupled to the computer processor and configured to send the compressed indication map generated by the computer processor, wherein the computer processor is further configured to:

compress M1 indication bits into one tiny partial bitmap sub-element when there are M1 consecutive indication bits whose values are not completely the same from a start position of a remaining to-be-compressed segment in the original indication map, wherein the tiny partial bitmap field of the tiny partial bitmap sub-element is used for indicating the M1 indication bits;

compress indication bits whose number is neither less than M1 nor greater than M2 into one skipped indication bits sub-element when there are consecutive indication bits with the same value whose number is neither less than M1 nor greater than M2 from the start position of the remaining-to-be compressed segment of the original indication map, wherein the skipped indication bits field of the skipped indication bits sub-element is used for indicating the number of the indication bits and the number is neither less than M1 nor greater than M2, wherein the skipped indication bits sub-element further comprises a skipped indication bit value field, wherein the skipped indication bit value field is used for indicating values of the indication bits whose number is neither less than M1 nor greater than M2, and M1 is less than or equal to M2; and compress indication bits whose number is greater than M2 into one indication bit offset sub-element when, from the start position of the segment of the original indication map remaining to be compressed, consecutive indication bits with the same value whose number is greater than M2 exist, wherein the indication bit offset field of the indication bit offset sub-element is used for indicating an indication bit serial number corresponding to an indication bit behind the indication bits whose number is greater than M2, wherein the indication bit offset sub-element further comprises a skipped indication bit value field, and wherein the skipped indication bit value field is used for indicating values of the indication bits whose number is greater than M2.

11. A wireless access device, comprising:
a computer processor configured to:

generate a compressed indication map, wherein the compressed indication map comprises at least one of a tiny partial bitmap sub-element, a skipped indication bits sub-element, and an indication bit offset sub-element, wherein the tiny partial bitmap sub-element comprises a tiny partial bitmap field and a tiny partial bitmap sub-element type indication field, wherein the tiny partial bitmap field is used for indicating a segment with a set length from a compress start position corresponding to the tiny partial bitmap sub-element in an original indication map corresponding to the compressed indication map, wherein the skipped indication bits sub-element comprises a skipped indication bits field and a skipped indication bits sub-element type indication field, wherein the skipped indication bits field is used for indicating a number of skipped consecutive indication bits with the same value from a compress start position corresponding to the skipped indication bits sub-element in the original indication map, wherein the indication bit offset sub-element comprises an indication bit offset field and an indication bit offset sub-element type indication field, wherein the indication bit offset field is used for indicating an indication bit serial number corresponding to an indication bit behind skipped consecutive indication bits with the same value from a compress start position corresponding to the indication bit offset sub-element in the original indication map; and a transmitter coupled to the computer processor and configured to send the compressed indication map generated by the computer processor, wherein the computer processor is further configured to:

compress N1 consecutive indication bits into one tiny partial bitmap sub-element when, from a start position of a segment of the original indication map remaining to be compressed, N1 consecutive indication bits that comprise a first-value indication bit exist, wherein the tiny partial bitmap field of the tiny partial bitmap sub-element is used for indicating the N1 consecutive indication bits;

compress second-value indication bits whose number is neither less than N1 nor greater than N2 into one skipped indication bits sub-element when there are consecutive second-value indication bits whose number is neither less than N1 nor greater than N2 from the start position of the remaining-to-be compressed segment of the original indication map, wherein the skipped indication bits field of the skipped indication bits sub-element is used for indicating the number of the second-value indication bits whose number is neither less than N1 nor greater than N2; and compress second-value indication bits whose number is greater than N2 into one indication bit offset sub-element when there are consecutive second-value indication bits whose number is greater N2 from the start position of the remaining-to-be compressed segment of the original indication map, wherein the indication bit offset field of the indication bit offset sub-element is used for indicating an indication bit serial number corresponding to an indication bit behind the second-value indication bits whose number is greater than N2, and N1 is less than or equal to N2.

* * * * *